(12) United States Patent
Trandafir

(10) Patent No.: US 7,058,195 B2
(45) Date of Patent: *Jun. 6, 2006

(54) SPEAKER ASSEMBLY

(76) Inventor: Roland Pierre Trandafir, 401 E. Mercer St., Apt. 17, Seattle, WA (US) 98102

( * ) Notice: Subject to any disclaimer, the term of this patent is extended or adjusted under 35 U.S.C. 154(b) by 326 days.

This patent is subject to a terminal disclaimer.

(21) Appl. No.: 10/437,716

(22) Filed: May 13, 2003

(65) Prior Publication Data

US 2004/0008101 A1 Jan. 15, 2004

Related U.S. Application Data

(60) Division of application No. PCT/US03/03970, filed on Feb. 5, 2003, which is a continuation-in-part of application No. 10/068,468, filed on Feb. 5, 2002, now Pat. No. 6,600,399, application No. 10/437,716, which is a continuation-in-part of application No. 10/068,468, filed on Feb. 5, 2002, now Pat. No. 6,600,399.

(51) Int. Cl.
    *H04R 25/00* (2006.01)

(52) U.S. Cl. ............... 381/409; 381/422; 381/410; 381/412; 381/420; 335/222

(58) Field of Classification Search ........... 335/222, 335/296, 299, 306; 381/422, 409, 410, 412, 381/419, 420, 421
See application file for complete search history.

(56) References Cited

U.S. PATENT DOCUMENTS

| | | | |
|---|---|---|---|
| 3,283,086 A | 11/1966 | Evans | |
| 3,919,498 A | 11/1975 | Beer | |
| 4,471,172 A | 9/1984 | Winey | |
| 4,635,287 A | 1/1987 | Hirano | |
| 5,142,260 A | 8/1992 | House | |
| 5,668,886 A | 9/1997 | Sakamoto et al. | |
| 5,717,775 A * | 2/1998 | Sakamoto et al. | 381/400 |
| 5,764,784 A | 6/1998 | Sato et al. | |
| 5,901,235 A | 5/1999 | Thigpen et al. | |
| 5,905,805 A | 5/1999 | Hansen | |
| 6,150,912 A * | 11/2000 | Elgin et al. | 335/299 |
| 6,741,151 B1 * | 5/2004 | Livshitz et al. | 335/222 |
| 2002/0191346 A1 | 12/2002 | Oki et al. | |

\* cited by examiner

*Primary Examiner*—Suhan Ni
*Assistant Examiner*—Dionne Harvey
(74) *Attorney, Agent, or Firm*—Christensen O'Connor Johnson Kindness PLLC

(57) ABSTRACT

An electromagnetic transducer is described including a magnet assembly (50) and a conductive drive coil (52). The magnet assembly provides an emanating magnetic field within which the drive coil is located. The drive coil is a flat ring coil having a width that is equal to or greater than its height. As assembled, the drive coil is mounted in close proximity to the magnet assembly such that relative axial motion may occur between them during use. In one embodiment, the magnet assembly includes two permanent disc magnets (64), (66) having axial magnetizations and being oriented with like poles facing one another to produce a radially emanating magnetic field. In another embodiment, the magnet assembly includes a pair of axially magnetized permanent ring magnets (64), (66) also oriented with like poles facing one another.

3 Claims, 22 Drawing Sheets

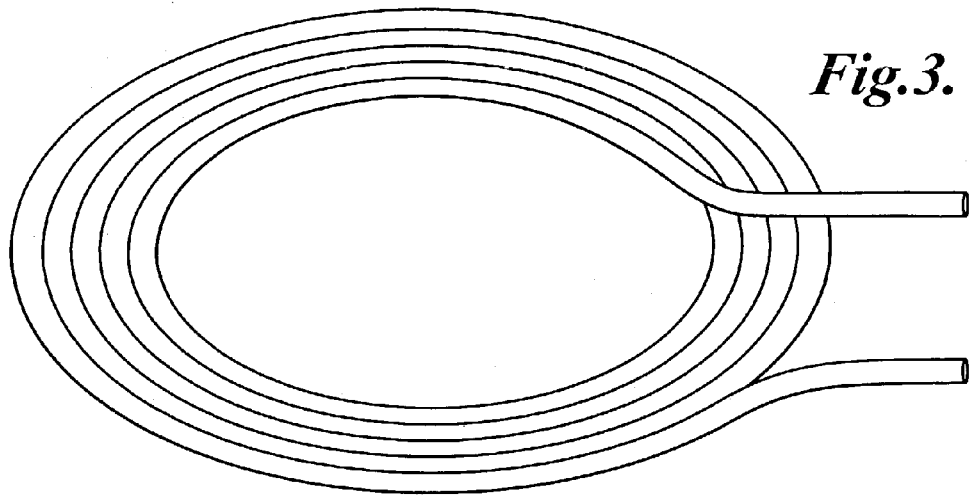
Fig.3.
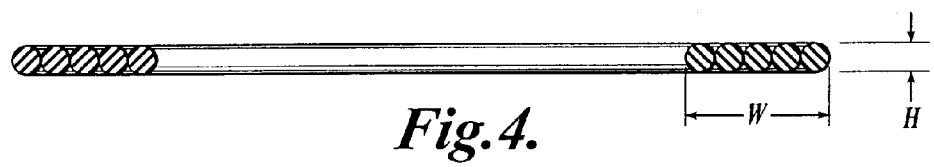
Fig.4.
Fig.5.
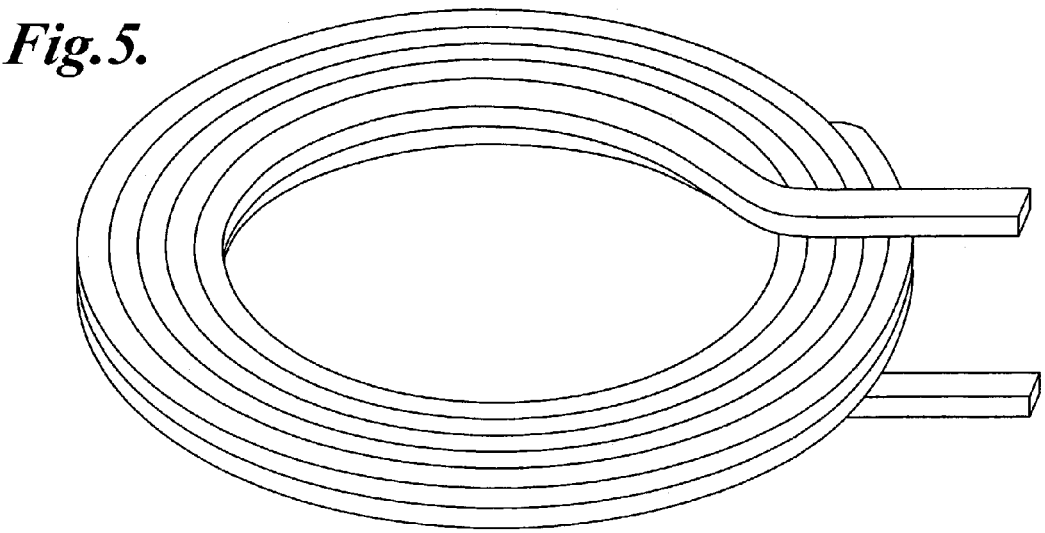
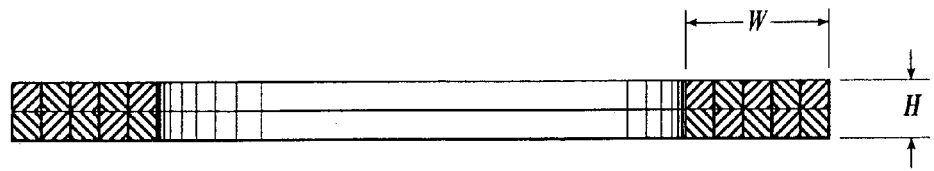
Fig.6.

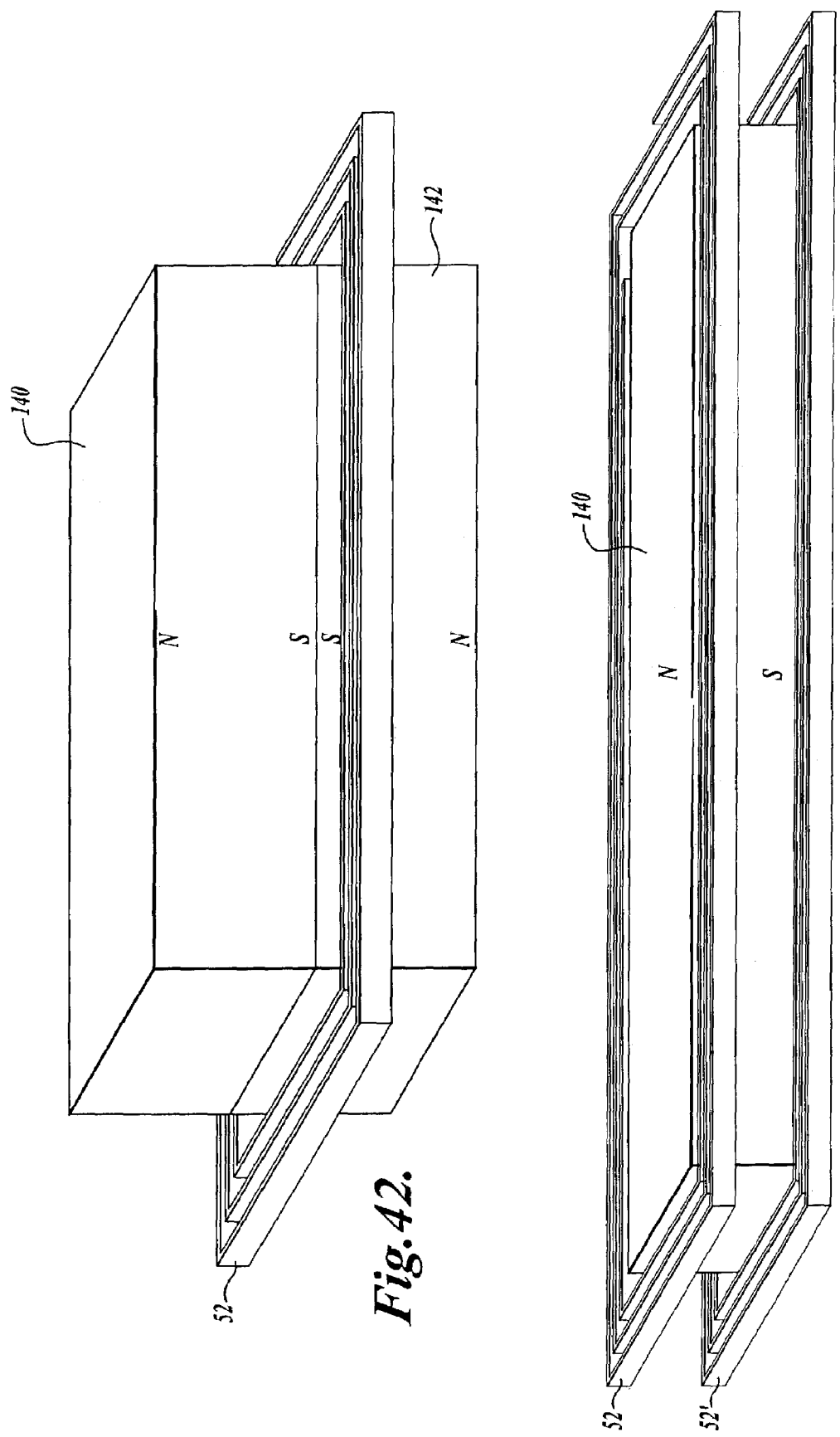

SPEAKER ASSEMBLY

CROSS-REFERENCES TO RELATED APPLICATIONS

This application is a divisional of International Application No. PCT/US03/03970, filed on Feb. 5, 2003, which is a continuation-in-part of U.S. application Ser. No. 10/068,468, filed on Feb. 5, 2002, now U.S. Pat. No. 6,600,399; and this application is also a continuation-in-part of U.S. application Ser. No. 10/068,468, filed on Feb. 5, 2002, now U.S. Pat. No. 6,600,399.

FIELD OF THE INVENTION

The present invention relates to electricity and magnetically operated switches, magnets, and electromagnets; and more particularly, to magnetomechanical motive devices with relatively movable coil and permanent magnet assemblies.

BACKGROUND OF THE INVENTION

Various types of transducer assemblies are known. One type, shown in U.S. Pat. No. 5,142,260 to William N. House, is illustrated in FIG. 1. This assembly includes a magnetic circuit structure 10 with two aligned magnetic discs 12, 14, which are axially polarized and oriented so their resultant flux fields oppose one another. A spacer 16 of either ferrous or nonferrous material is sandwiched between the magnets 12, 14 to help control the magnetic field characteristics. As a result of the opposing axial alignment, magnetic flux lines 18 emanate from the magnetic poles 20, 22 that face each other and are focused and directed radially outward from the region 24 between the magnets 12, 14.

This prior art structure serves two functions—to increase the number of flux lines per unit cross-sectional area in the region adjacent the structure's outer surface 26, and to direct the flux lines 18 on paths essentially perpendicular to the axis 28 of the structure. Ideally, all flux lines 18 emanating from the structure 10 would be in directions perpendicular to the structure's axis 28 to maximize the force on a cylinder conductor 30 throughout its axial length. However, as stated in the '260 patent, regions of flux lines exist that are not perpendicular to the structure's axis. If a current carrying conductor 30 moves in an axial direction from a center region A to a magnet's center region C, the instantaneous force on the conductor 30, in the direction parallel to the axis 28, decreases as a function of the angle to zero. This leads to the phenomenon described in the '260 patent termed "field reversal". Field reversal is typically one of the restrictions encountered with returnless path structures, such as structure 10 in FIG. 1. Thus, motion of coil 30 in a linear direction will generally occur only within a relatively small portion of the axial length.

U.S. Pat. No. 5,142,260 addresses these problems by sandwiching one or more additional radial magnets and/or spacers between the opposing magnets of the prior art assemblies. The radial magnets' outer poles have the same polarity as the magnets' facing poles. Flux lines emanating from the radial magnets are opposed by the fields of the axial magnets and directed outward on a path perpendicular to the structure's axis. The radial magnets' flux lines travel outward and around to the opposite polarity poles of the axial magnets. According to the '260 inventor, this increases the total flux lines provided by the structure.

The devices described in U.S. Pat. No. 5,142,260 still have a number of drawbacks. It appears that the '260 inventor sought to increase coil performance by lengthening the coil/magnetic field interaction distance and by ensuring that the drive coil wire was as close to the magnet assembly as possible. In doing so, the coil and the outward magnetic field flux lines were both lengthened. These steps increase the weight and complexity of the magnetic system and further cause an increase in the force on the coil, which leads to nonlinearity in the coil's response to the magnetic field as the coil oscillates during its excursion. In general, such systems are inefficient because they require many windings in order for their drive cylinder to effectively interact with the increased magnetic field size. In addition, they tend to overheat and/or require cooling, and they tend to develop various signal distortions during use. In sum, the above problems cause the '260 devices to be inefficient, heavy, and expensive to manufacture. In addition, extensive periods of zero or reverse force on the coil persist at pole reversal.

To address some of the above drawbacks, designers have attempted to restrict excursion distance and design a relatively flat transducer. For example, U.S. Pat. No. 5,668,886 to Sakamoto et al. describes a loudspeaker having two magnets with like poles facing one another and held in place by opposed frame members. A ferrous center plate is interposed between the two magnets. A cylindrical voice coil is positioned about the magnets and center plate. A diaphragm is mounted laterally about the exterior periphery of the voice coil. The '886 device appears similar to conventional dynamic transducers, except that a ferrous center plate is used to direct a single radially emanating magnetic field outward. The '886 device is still relatively heavy and still requires a tall, cylindrical drive coil to interact with the magnetic field at close range.

The device of U.S. Pat. No. 5,764,784 to Sato et al. describes a single disk magnet fixed to an inner surface of a flat casing. Within the casing, a diaphragm is spaced apart from the magnet. A relatively short, hollow, cylindrical drive coil is coaxial with the magnet and is fixed to an opposed face of the diaphragm. According to the '784 inventors, this arrangement has diminished power consumption, reduced thickness, and greater efficiency. The '784 device suffers, however, in that the diaphragm is limited in the distance it can travel during use, since it will rapidly hit the magnet face if the input signal is of sufficient strength. In addition, the '784 drive coil is not entirely immersed in a symmetric field throughout its excursion travel. This can affect signal purity and can be a source of signal distortion.

U.S. Pat. No. 5,905,805 to Hansen describes a transducer with a circular center diaphragm. A flat planar drive coil is formed on one surface of the diaphragm. A pair of opposed cylinder magnets is provided, one magnet being spaced apart from each side surface of the diaphragm. The magnets are in a repulsing configuration, with like pole faces oriented toward one another. This produces a radially emanating magnetic field. As in the '784 device, though, the '805 device is limited in the distance the diaphragm can travel before it hits one of the cylinder magnets. This design also suffers from the relatively minor amount of interaction between the planar coil windings and the radially emanating magnetic field.

Thus, a need yet exists for a transducer that avoids the pitfalls described above. Ideally, such a transducer would be short in height and light in weight. Its drive coil would interact efficiently with the magnetic field and produce greater linearity of response throughout a large frequency spectrum. In addition, such an improved transducer would not overheat or require cooling, thus maintaining a much higher and more consistent power output throughout its operation. Similarly, more power output per weight of the device would be available as well as greater excursion distance of the coil.

SUMMARY OF THE INVENTION

The present invention is directed to fulfilling these needs and others, as discussed herein. An electromagnetic transducer is described having a magnet assembly and a conductive drive coil. The magnet assembly includes first and second opposed outer pole faces and a magnetic field that emanates radially outward. The conductive drive coil is a flat ring coil, formed so that its width is greater than or equal to its height. The drive coil is located in the radially emanating magnetic field of the magnet assembly. A space exists between the magnet assembly and the drive coil so that, during use, the drive coil is not in physical contact with the magnet assembly. The drive coil moves along an excursion path, of which at least a portion is located between the magnet assembly's outer pole faces. As assembled, the drive coil is mounted in close proximity to the magnet assembly such that relative axial motion may occur between them during use. When used as a motor, an electric current is supplied to the coil, causing the coil and the magnets to move relative to one another. When used as a generator, external physical movement of the drive coil relative to the magnets causes production of a corresponding electric current in the drive coil.

In accordance with other aspects of this invention, the magnet assembly may be formed of either axial or radial magnetizations. In addition, single magnets may be used or multiple magnets may be configured with like poles facing one another. In one embodiment, the magnet assembly is formed from a pair of axial disc magnets. The disc magnets include a diameter size. The drive coil's inner diameter size is larger than the disc magnets' diameter so that the drive coil surrounds the disc magnets. In another embodiment, the magnet assembly includes two axial ring magnets. The ring magnets form both an outwardly emanating magnetic field and an inwardly emanating magnetic field. The drive coil is of a ring shape and may be located in either of these fields.

In accordance with further aspects of this invention, various magnet assembly shapes may be used, such as arcuately shaped magnets or rectangularly shaped magnets.

In accordance with yet other aspects, various speaker devices and microphone devices are described, each formed in accordance with the present invention.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein:

FIG. 3 is a perspective view of a first embodiment of a drive coil formed in accordance with the present invention;

FIG. 4 is a cross-sectional side view of the coil of FIG. 3;

FIG. 5 is a perspective view of a second embodiment of a drive coil formed in accordance with the present invention;

FIG. 6 is a cross-sectional side view of the coil of FIG. 5;

FIGS. 37, 38, 39, 40, 41, 42, 43, and 44 are perspective schematic views of still further alternative embodiments of a transducer formed according to the present invention, illustrating arrangements having noncircular magnet shapes;

DETAILED DESCRIPTION OF THE PREFERRED EMBODIMENT

This invention relates to transducer motor and/or generator assemblies and particularly to a returnless transducer assembly construction. The invention is for use in numerous contexts, including sonic devices, relays, switches, oscillators, and other energy-transforming devices, in the extremely low frequency through ultrasonic and radio frequency spectra, as sensors or signal emitters.

Figures 1, 2:
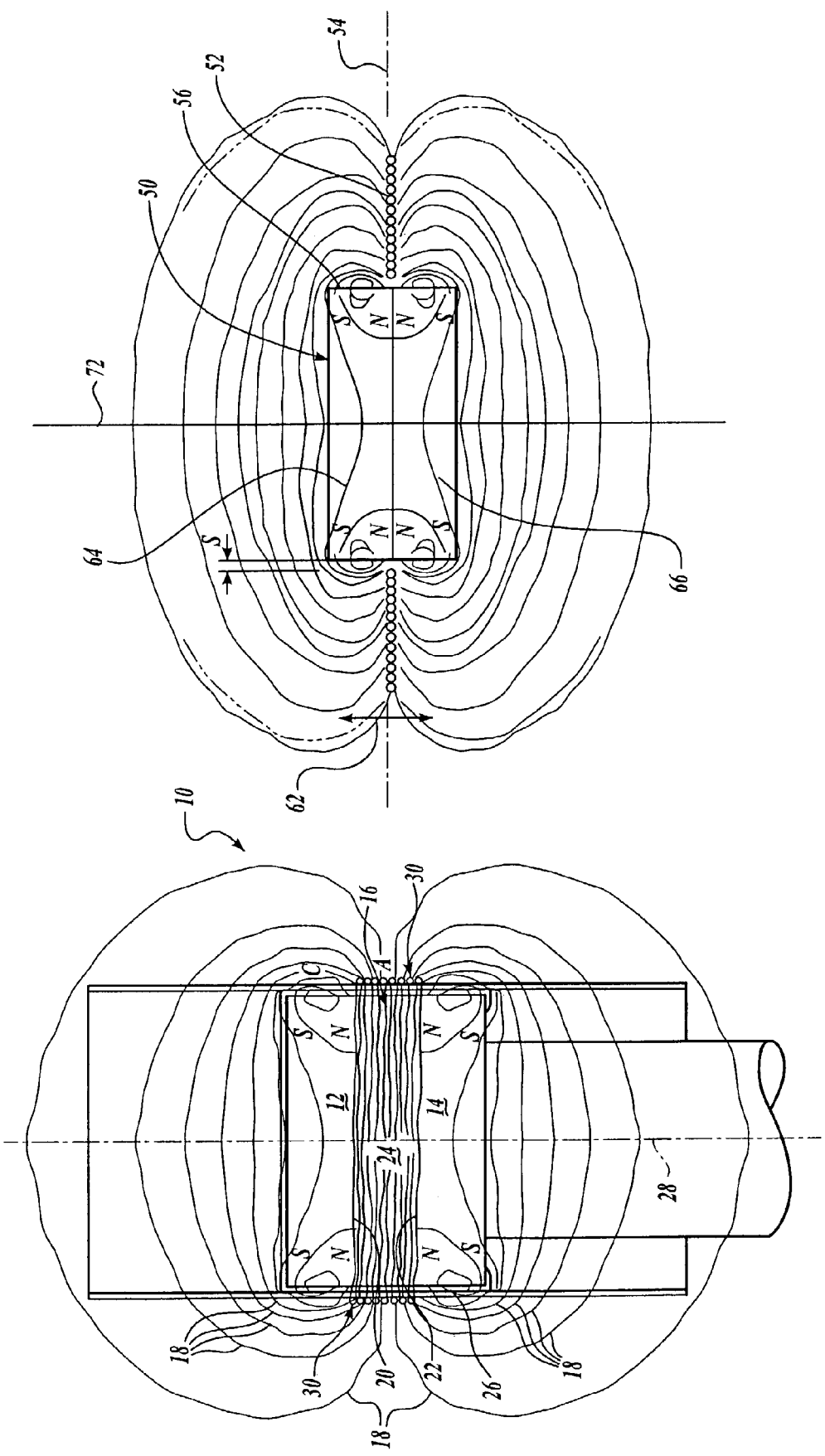
FIG. 1 illustrates a side view through a prior art permanent magnet motor assembly.
FIG. 2 illustrates a side view through a first embodiment of a permanent magnet motor assembly constructed according to the present invention.

In general and referring now to FIG. 2, a permanent magnet assembly 50 is provided for reciprocating a current-carrying conductor 52 formed in a horizontal plane 54. The magnet assembly provides a magnetic field that extends outward of and transverse to a vertical, or axial, magnet direction. (The directions provided in this description are in reference only to the drawings provided. During use, the "vertical" direction may in fact be horizontal or at an angle, while the "horizontal" direction may be vertical or at an angle.) Conductor 52 is spaced from the outer surface 56 of assembly 50 by any of a number of means, such as a centering interface material and/or a surrounding bracing support structure. According to the present invention, the conductive drive coil has an overall height that is less than or equal to its overall radial width defined by the difference between the coil's inner and outer sizes. Such a coil is generally referred to herein as a "flat ring coil".

Alternating current flowing through the conductor 52 causes the conductor 52 to reciprocate in the directions of arrows 62, essentially axially of the magnet assembly 50. If other components are attached to the drive coil, these other components may be made to reciprocate as well. When configured as such, the transducer is generally referred to herein as a motor. Alternatively, the transducer may be used as a generator, in which case, motion is converted into electrical signals via movement of the coil relative to the magnet assembly. If the transducer is used as a generator, then external mechanical oscillations cause the coil to move within the magnetic field provided by the magnet assembly. This motion produces a corresponding current in the coil.

In more detail and referring still to the embodiment of FIG. 2, an outwardly emanating magnetic field is produced by positioning two magnets with like pole faces toward one another (i.e., either in a south-south or north-north arrangement). The magnet assembly of FIG. 2 includes first and second permanent disc magnets 64, 66, each magnetized in the axial direction. The axis of the magnet assembly is labeled item 72 in FIG. 2. By positioning like pole faces toward one another, the magnetic flux lines emanate radially outward from the facing surfaces of the first and second magnets, i.e., in a direction parallel to the magnet pole faces and transverse to their axial magnetizations. The first and second magnets thus produce flux lines that fan outwardly from the first and second magnets in a radial direction and return to their opposite poles. In FIG. 2, the first and second disc magnets are positioned directly opposite one another and have same-sized diameters at the location of the outwardly emanating magnetic field.

Various coil arrangements are possible, some examples of which are illustrated in FIGS. 3–14. In general, the drive coil has a ring shape with a height dimension, H, and a width dimension, W. The height of the coil is defined as the distance between its windings' upper and lower surfaces. The width of the coil is defined as the distance between the coil's inner and outer horizontal sizes. For example, with circular drive coils, the width is defined as the radial distance between the coil's inner and outer diameters. According to the teachings of the present invention, the width of the coil is at least as great as the coil height. For this reason, the present invention coil is generally defined as a "flat ring coil".

Figure 7:
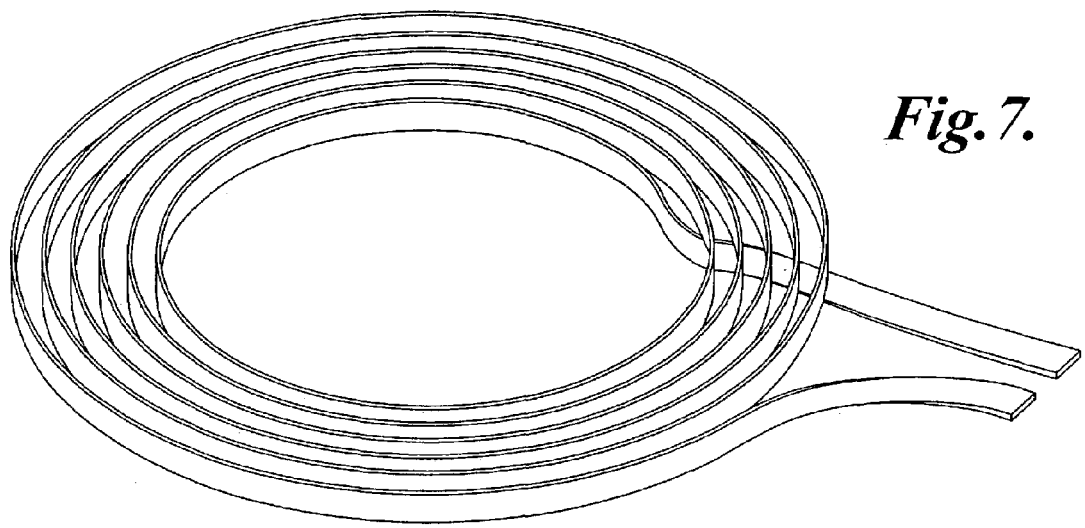
FIG. 7 is a perspective view of a third embodiment of a drive coil formed in accordance with the present invention.
Figure 8:
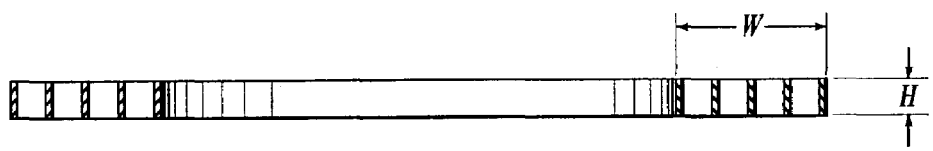
FIG. 8 is a cross-sectional side view of the coil of FIG. 7.
Figure 9:
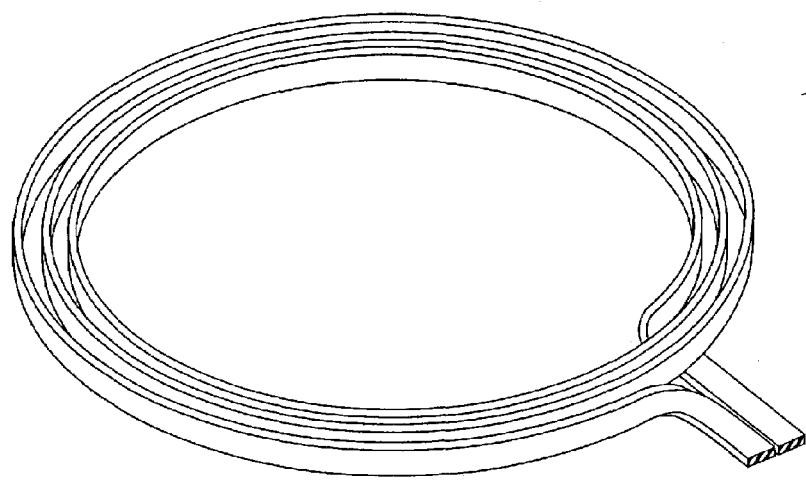
FIG. 9 is a perspective view of a fourth embodiment of a drive coil formed in accordance with the present invention.
Figure 10:
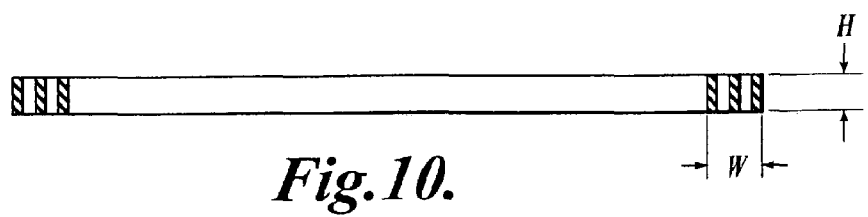
FIG. 10 is a cross-sectional side view of the coil of FIG. 9.
Figure 11:
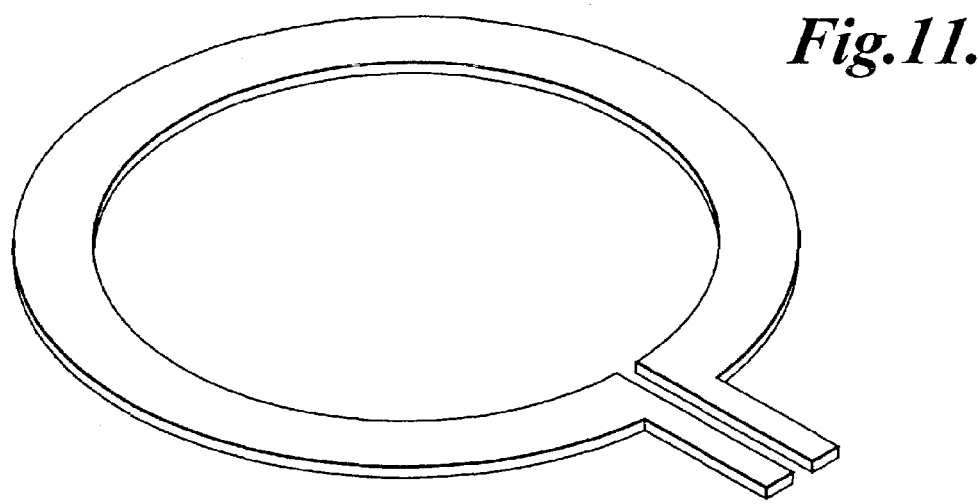
FIG. 11 is a perspective view of a fifth embodiment of a drive coil formed in accordance with the present invention.
Figure 12:
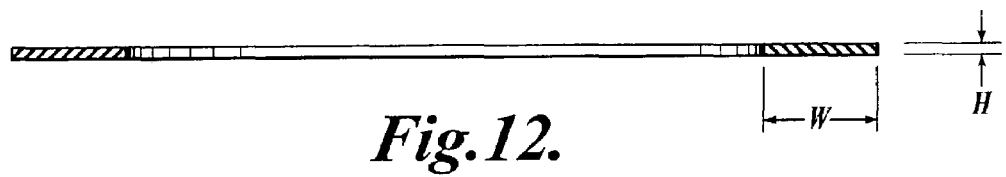
FIG. 12 is a cross-sectional side view of the coil of FIG. 11.
Figure 13:
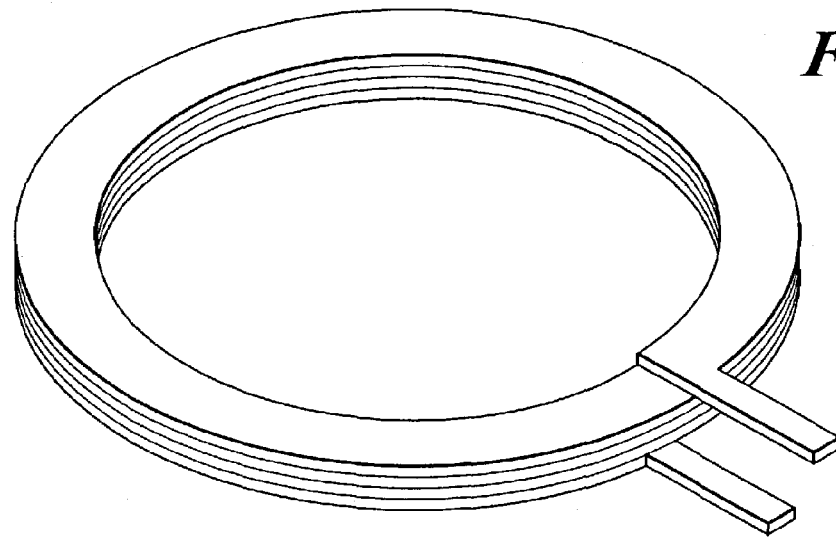
FIG. 13 is a perspective view of a sixth embodiment of a drive coil formed in accordance with the present invention.
Figure 14:
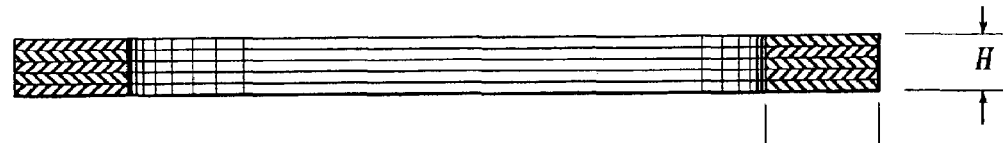
FIG. 14 is a cross-sectional side view of the coil of FIG. 13.

The drive coil is preferably a flat ring, spirally wound about its inner diameter. In the embodiment of FIGS. 3 and 4, the wire has a circular cross-sectional shape. In FIGS. 5 and 6, the cross-sectional shape is rectangular. The embodiments of FIGS. 7 and 8 show drive coils formed from a single layer winding of upright ribbon wire. In FIGS. 9 and 10, the drive coil is formed from a single layer winding of upright flat wire. In FIGS. 7–10, the distance between windings is exaggerated for illustrative purposes. In many applications, these windings would be more tightly made. FIGS. 11 and 12 illustrate a single winding of one lateral wire. FIGS. 13 and 14 illustrate multiple windings of a lateral wire. Further, in some embodiments, the drive coil may be formed of multiple layers of windings (see FIGS. 5 and 6).

Referring back to FIGS. 9 and 10, the drive coil is a rectangular flat wire, spirally wound in an upright orientation. It is the inventor's current understanding that using flat or ribbon wire instead of round wire for the coil may increase transduction performance, since field strength diminishes as distance from the source increases. Flat or ribbon wire may thus be better suited for the drive coil because a greater number of windings can be packed more closely to the magnet source. The wire is wound with its broad side vertical where the wire's height is parallel to the vertical axis of the device (similar to a roll of tape). Excellent experimental results have been found with a flat wire cross-sectional ratio of 3:1 (height:width). With the height of the wire in the vertical axis, the greatest possible number of flux lines is able to traverse the windings of the coil when immersed in the radial field. In some cases, a 4:1 or even an 8:1 cross-sectional wire ratio may offer advantages, depending on the particular application. Conductive wire having larger height to width ratios (e.g., five or more to one) may be referred to generally as ribbon wire.

The coil may also be formed from wire made of a conductive alloy coating on a thin dielectric material (e.g., plastic). In some cases, the coil may be of a planar arrangement (i.e., formed directly onto a diaphragm or other support member), in which case the broad side of the wire would be horizontal. This arrangement, however, is less efficient for some applications than the upright tape-type winding of the flat wire.

In each case, the overall coil height may approach its radial width, but not pass it. In preferred embodiments, the coil has numerous windings and a width that is significantly greater than the height. The drive coil can be made from a variety of different types of wire with regard to shape as well as material composition. The selection of materials depends largely on the performance characteristics desired in the particular use of the transducer. The selection of wire is also affected by factors such as power output, frequency range, and the physical size of the device.

When designing a transducer for a particular application, the overall coil height should not be made too large, otherwise portions of the coil will not interact efficiently with the magnetic field, thus potentially adding unnecessary weight and thickness to the transducer.

As assembled, the drive coil is located outward of the magnets, thereby causing the coil to be located within the outwardly emanating magnetic field where the coil's interaction with the field may be optimized. The drive coil is concentric to the magnets, with the coil axis sharing the magnets' axes. The body of the coil is in the horizontal plane, perpendicular to the components' vertical axes. Since the coil is essentially in a horizontal plane of symmetry, the coil laterally divides the first and second magnetic regions. The magnetic assembly is therefore said to be bilaterally symmetrical across the horizontal plane. The magnet halves can be visualized as mirror images of each other with the coil in the position of the mirror, or in the horizontal plane itself. (From a mathematical perspective, the horizontal plane of symmetry has only radial magnetic field vector components and no axial components. Above and below this plane, the magnetic field includes both radial and axial components.)

In a diverging radial field where the magnetic field spreads away from the disc magnets' outer surface, the drive coil's inner diameter is sized slightly larger than the outer diameter of the first and second disc magnets. As shown in FIG. 2, between the drive coil and magnets is a narrow space, s. This space, s, is preferably as small as possible without letting the drive coil touch the magnets during use. For example, in one embodiment, the space s is within the range of about 0.5 mm to about 5.0 mm. As will be appreciated, however, the space size is preferably proportional to the magnet size. The larger the magnet, the larger the magnetic field produced and the larger the allowable space size. The nontouching position of the coil to the magnets allows the coil free movement up and down the periphery of the magnet assembly, within the desired coil excursion distance. Thus, the drive coil is not directly physically impeded by the magnets. By staying close to the magnets, the coil maintains a close relationship with the magnets' field, where its density is the strongest. In general, the size of the space s, the type of drive coil configuration, and the types of materials used will depend on the desired magnetic field strength, the anticipated input, and the desired transducer performance.

During use as a motor, an electric current is supplied to the coil, causing the coil to move relative to the magnetic assembly. Alternatively, if the transducer is used as a generator, then exterior oscillations cause the coil to move within the magnetic field provided by the magnet assembly. This motion produces a corresponding current in the coil.

There are numerous variations that are possible with the above basic invention description. Each of these variations is discussed in detail below. One variation is the use of a flexible interface member between the magnet assembly and the drive coil. The interface member may be provided to aid in the transducer's manufacture. It may also be used to alter the drive coil's response and/or limit the coil's excursion distance. Another variation is the use of spacers, end caps, radial magnets, and multiple discs to help shape the outwardly emanating magnetic field of the magnet assembly. Yet another variation is the formation of the magnet assembly with only a single magnet. Alternatively, a magnet assembly may be made using more than two magnets.

Depending on the arrangement of the magnet assembly and the particular performance characteristics desired, an optional flexible interface member 80 may be used in this space. In the embodiment shown in FIG. 15, the interface member is located between the first and second magnets and is adhered directly to the magnets' facing surfaces. Thus, the interface member is placed in the horizontal plane of the device with the top surface of the interface member being glued to the bottom surface of the top magnet and the bottom surface of the interface member being glued to the top surface of the bottom magnet. (Alternatively and depending on the particular configuration, instead of being connected to the disc magnets, the interface member may be connected to a spacer, a radial magnet, a ring magnet, or some other shape of magnet in either a magnet pair or singularly. See the descriptions of these components below.)

Figure 15:
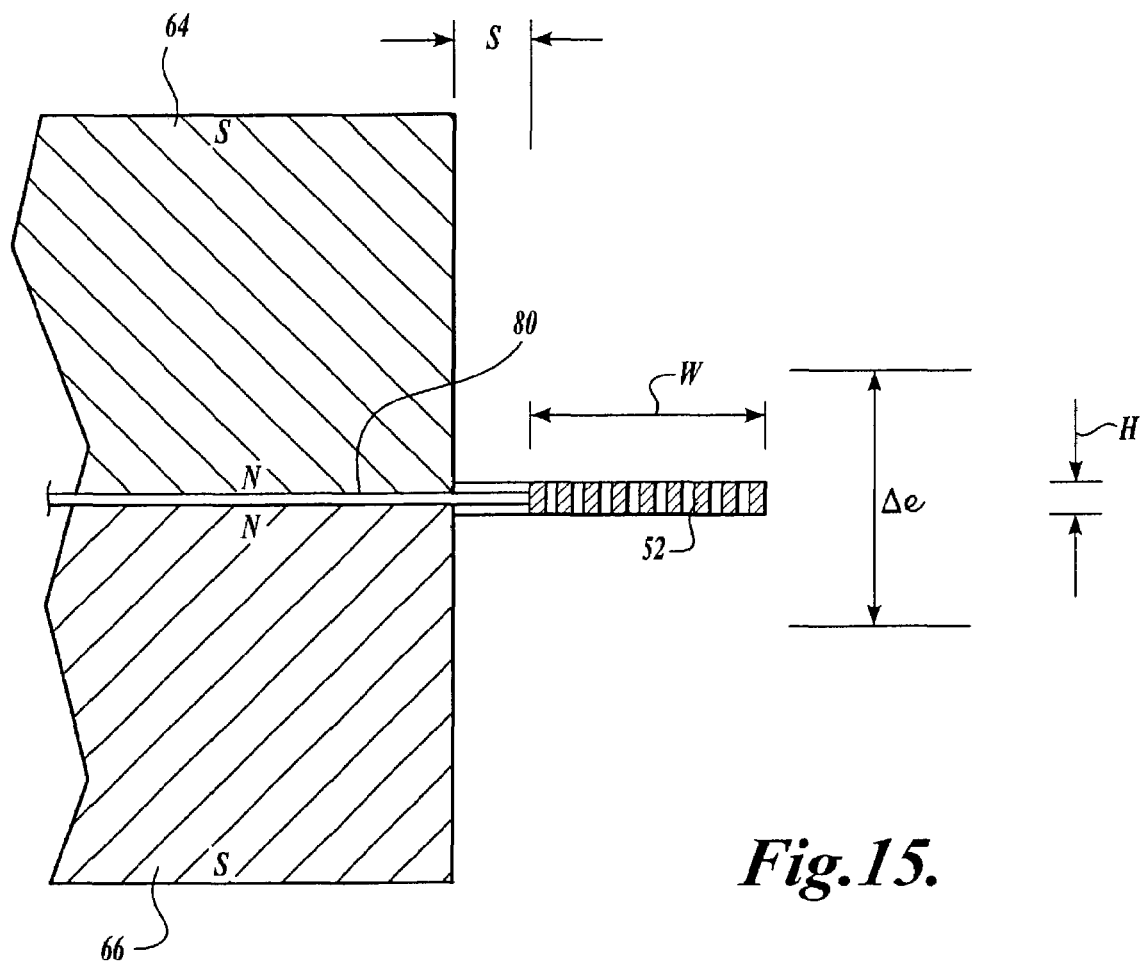
FIG. 15 is a cross-sectional side view of an alternative embodiment of a transducer formed according to the present invention, illustrating an interface member.

The attachment of the interface member to the drive coil is preferably made in a manner not impeding coil oscillation, though secure and strong enough to dampen coil movement near excursion limits, if so desired. In FIG. 15, the interface member has a circular shape and an outer perimeter that is adhered to the inner perimeter of the drive coil. Any conventional attachment method may be considered for use, including bondings, adhesives, etc. Alternatively, the drive coil may be attached to the upper or lower surface of the interface member. In drive coils having multiple stacked windings, the drive coil may be attached to both the upper and lower surfaces of the interface member.

The movement of the drive coil relative to the magnet occurs along a path called an "excursion path", denoted herein by the symbol "$\Delta e$". The coil excursion path is the vertical distance the coil will travel relative to the magnet assembly during operation. As stated above, the interface member may be used to alter the coil's movement within its excursion path and/or dampen the coil's movement at the excursion path limits. The interface size and material will therefore depend on the type of drive coil used, the strength of the magnetic field, the anticipated input, and the desired transducer performance.

It is the understanding of the inventor at this time that the choice of interface material is based principally on the frequency range of the device and the desired damping properties. For example, at low frequencies, the interface member may be unnecessary (see FIGS. 2 and 18), or only a very flexible thin material may be used. In this way, the material would not overly dampen a desired large excursion path. In the case of successively higher frequencies, thinner and stiffer materials may be a more appropriate choice for interfacing these components. As frequency increases, the length of the excursion path decreases proportionately. In general, the size of the excursion distance will vary depending on the frequency of the input. Smaller frequencies result in proportionately smaller excursion distances.

Figure 16:
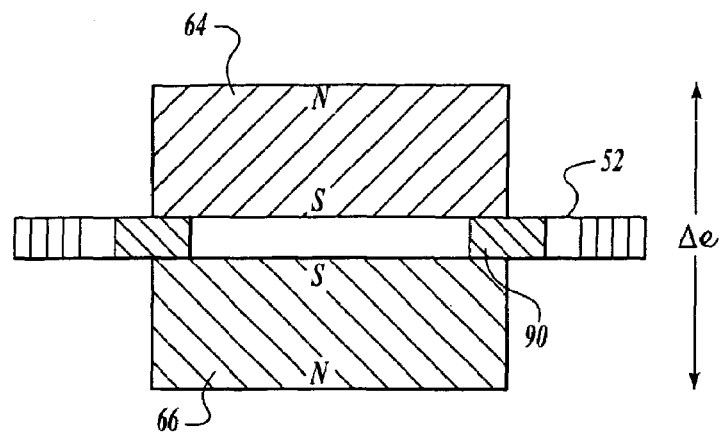
FIGS. 16, 17, and 18 are cross-sectional schematic side views of other alternative embodiments of a transducer formed according to the present invention, illustrating the use of spacers, end caps, and spaced-apart magnet arrangements.
Figure 17:
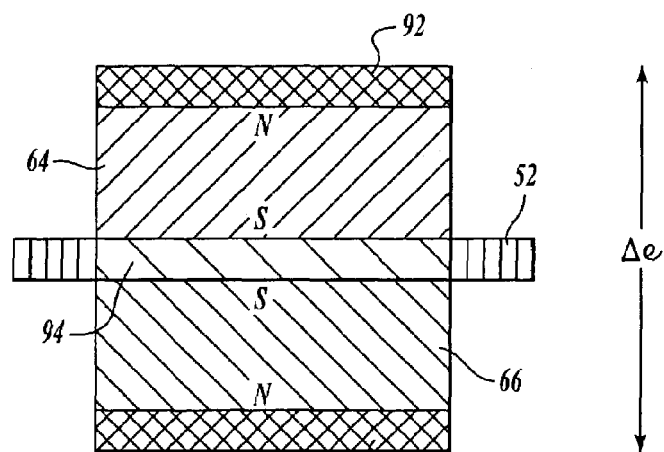

Shaping of the outwardly emanating magnetic field may be accomplished using spacers, end caps, and radial magnets. Referring to FIG. 16, a ring-shaped ferrous spacer 90 is provided between the first and second disc magnets. In FIG. 17, circular ferrous end caps 92, 92' are used both above and below the first and second magnets to shape the magnetic return path. In one embodiment, the spacer, end caps, and both disc magnets are of equal diameter. Alternatively, the spacer and end caps may be made of a nonferrous material 94 (such as a dielectric—wood, bone, plastic, etc., or an electrically conductive material copper, zinc, aluminum, silver, etc., or an alloy combination of all or some of these materials) or be of an unequal size. In addition, the spacers and/or end caps may assume numerous shapes, such as discs, rings, bars, etc. The ferrous spacer and end caps may be of equal, less than, or greater size relative to the magnets or relative to each other. The nonferrous spacer and end caps are preferably of less than or equal size than the magnets themselves (in diameter or other relevant width dimension). For example, when using disc magnets, the spacers and end caps may have a diameter that is less than the disc magnets' diameter. Overall, the specific dimensions and materials will depend on the flux line shaping desired for a given application.

Figure 18:
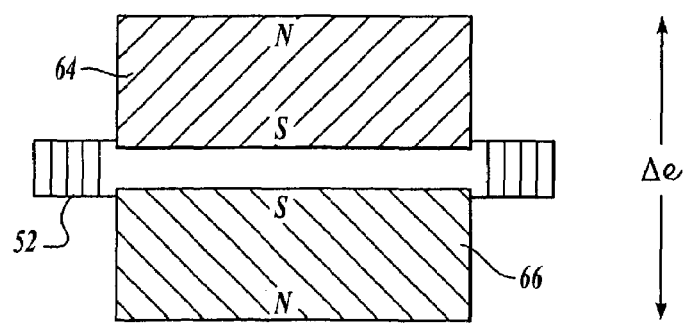
Figure 45:
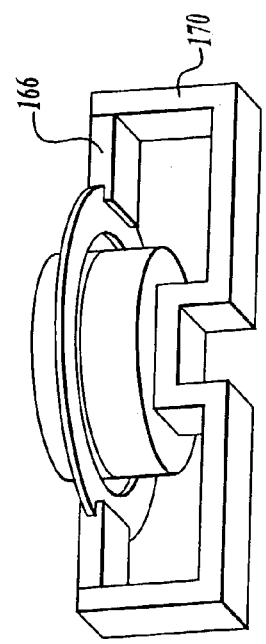
FIG. 45 is a schematic perspective view of an example of support means formed in accordance with the present invention.

In FIG. 18 no interface member, spacer, or end caps are used. Instead, the first and second magnets are positioned apart from one another so that an open space is made between them. This too will have an effect on the shape of the outwardly emanating radial magnetic field. (This spaced apart relationship may be accomplished using a second structural member similar to the member 170 shown in FIG. 45.)

Figure 19:
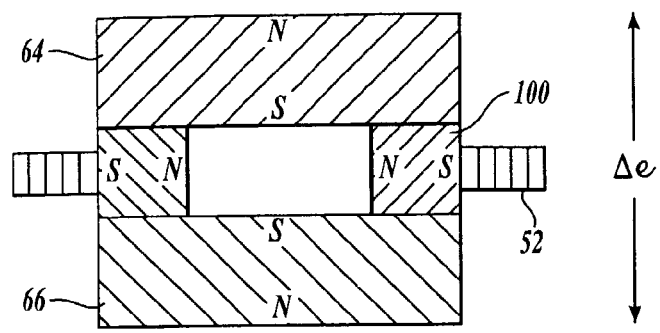
FIGS. 19, 20, 21, and 22 are cross-sectional schematic side views of further alternative embodiments of a transducer formed according to the present invention, illustrating the use of radial ring magnets.
Figure 20:
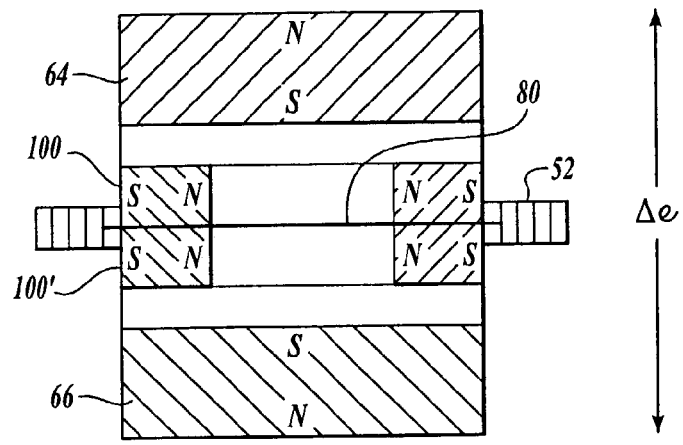
Figure 21:
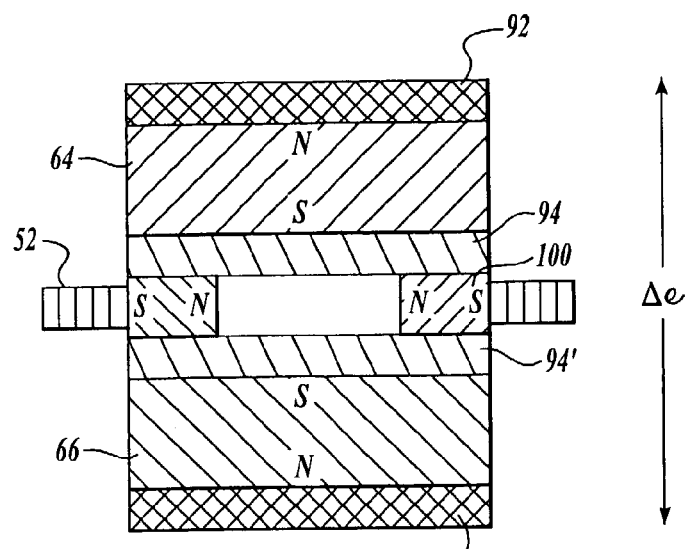
Figure 22:
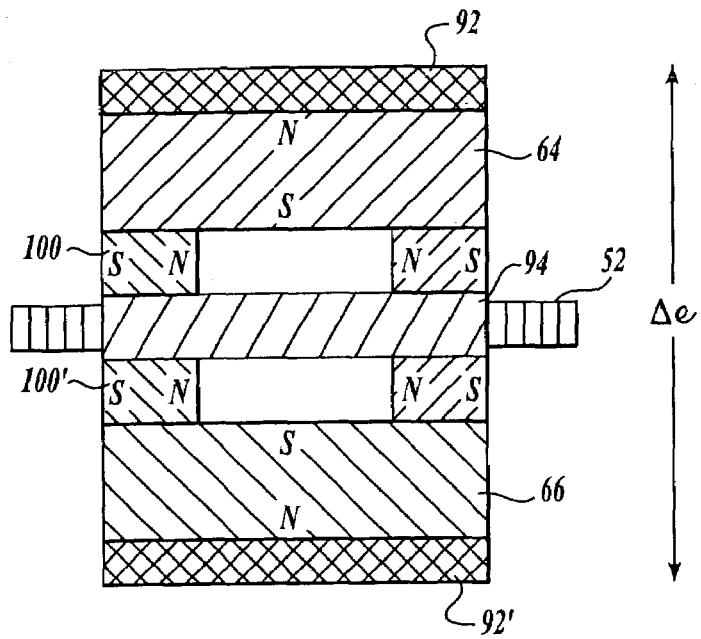

Referring to FIG. 19, a radially magnetized permanent ring magnet 100 has a radial inner pole of opposite polarity to the facing poles of the first and second magnets and a radial outer pole of the same polarity as the facing poles. This configuration shapes the magnetic field of the assembly to provide a more uniform radial magnetic field over a greater percentage of the total length of the assembly. In radial magnets, the magnetic fields issue from the sides or periphery of the ring structure, so that the curved outer and inner side surfaces are actually the pole faces. A flat ring coil is placed around the midheight of the single ring radial magnet or inside its inner diameter. If more than one ring magnet is used in the magnet assembly, then the drive coil is placed in the center in the horizontal plane where the greatest flux density is found. A spacer 94 or gaseous opening may be provided between the magnet poles and the radial magnet (see FIGS. 20 and 21) or between multiple radial magnets (see FIG. 22).

Figure 23:
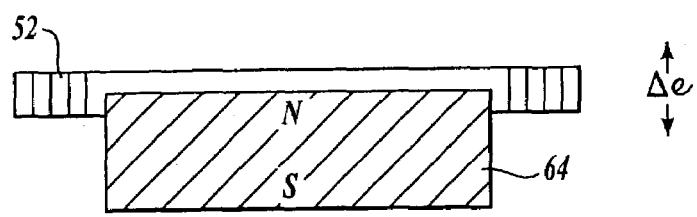
FIGS. 23, 24, 25, and 26 are cross-sectional schematic side views of still other alternative embodiments of a transducer formed according to the present invention, illustrating the use of single- and multiple-magnet configurations.

In yet another embodiment, the magnet assembly is formed with only a single magnet. See FIG. 23. Single-magnet assemblies are particularly useful in higher frequency applications where the excursion distance is expected to be of a smaller size. In a one axial magnet system, however, the placement of the flat ring coil would not be at the midheight of the magnet. Although this arrangement would be correct for establishing physical symmetry (bilateral across the horizontal plane), the magnetic field lines across the coil would not be correct. In this position, the coil is not exposed to a radially emanating field, and is therefore in its weakest interactive placement with regard to the magnet. The present invention's drive coil is most effective when placed in the field region having a radial magnetic vector that is greater than the axial magnetic vector. The coil's performance is weakened when the axial magnetic component is greater than the radial component. Thus, in a one-magnet axial assembly, the placement of the drive coil will be in the region of the magnet pole face and with the pole face being at approximately the midpoint of the excursion range. In order to operate effectively, the drive coil should be able to move freely about the magnet assembly, both above and below the magnet pole face, in either the converging or diverging field designs. This maintains the coil's placement within the region of strongest radially emanating flux density.

For the single magnet, the radiation source is from the fringe fields that are near the corner of the magnet face and side (in axially oriented magnetizations). This area of radiation is found in a narrow region, slightly above and below the face of the magnet, closest to the magnet corner where the field is strongest. The lines radiate outwardly, parallel to the surface of the magnet pole face. These radial emanations are the most effective for the performance of the flat ring coil. Since the flux lines have their greatest density slightly above and below the magnet pole face, it becomes important for the coil to be able to oscillate freely in this region.

In a single axial magnet system, the drive coil is preferably placed close enough to the exterior surface of the magnet so that the magnetic field emanating from the magnet's pole face radiates laterally outward at the pole faces and essentially radiates at symmetric angles both above and below the pole face. The strongest interactive placement of the drive coil in a single axial magnet configuration is thus flush to either pole face of the magnet in order to maximize the radial field through the flat drive coil. In addition, the drive coil's width need not extend too great a distance from the magnet assembly since the radially emanating field at the pole face will become increasingly less symmetric above and below the plane of the pole face as the radial distance from the magnet increases. It is also in these farther regions that the magnetic field becomes weaker and less amenable to use. Stated differently, as one gets farther from the magnet, both the field strength and the symmetry decrease. Closer to the magnet, these characteristics increase. Thus, field strength and horizontal symmetry about the pole face should be considered when deciding the size of and number of windings in the drive coil.

Figure 32:
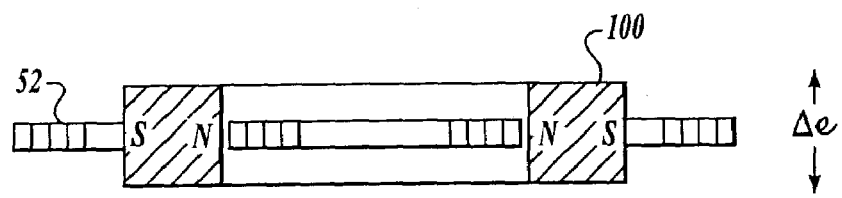
Figure 33:
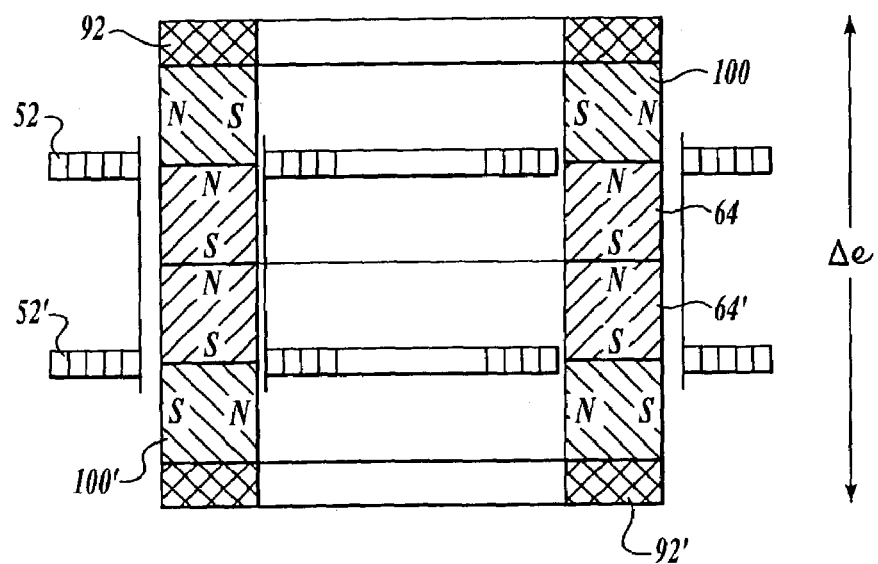

For a single radial ring magnet, see FIG. 32, the horizontal plane will bisect the ring at midheight horizontally. This location is the magnetic plane of symmetry where the radial field strength is greatest. If several radial ring magnets are stacked on top of each other, the horizontal plane of symmetry is located in the middle of the region having the greatest flux density. This positioning creates a similar field pattern above and below the plane. Bilateral field symmetry is an important factor in creating clean signals.

Figure 24:
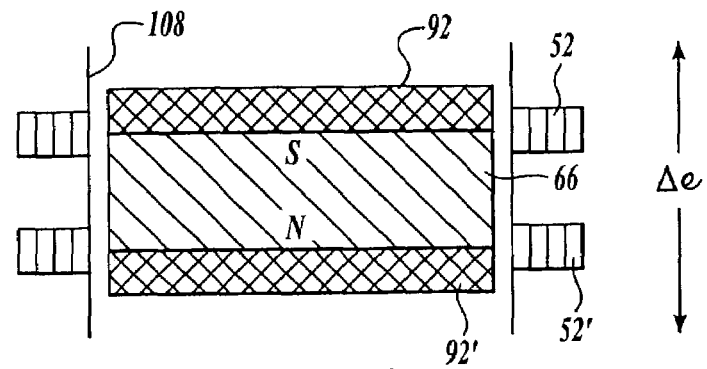

As shown in FIG. 24, various end caps may be used to further shape the outwardly emanating field. Also shown in FIG. 24 is a second flat drive coil 52' connected to a first flat drive coil 52 via a former 108. Alternatively, this second drive coil 52' may be unconnected to the first, e.g., to address different frequencies.

Figure 25:
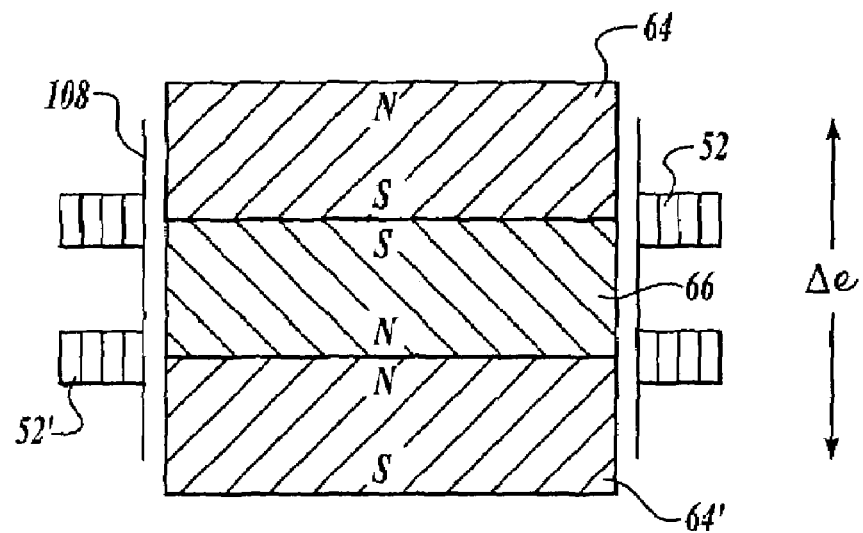
Figure 26:
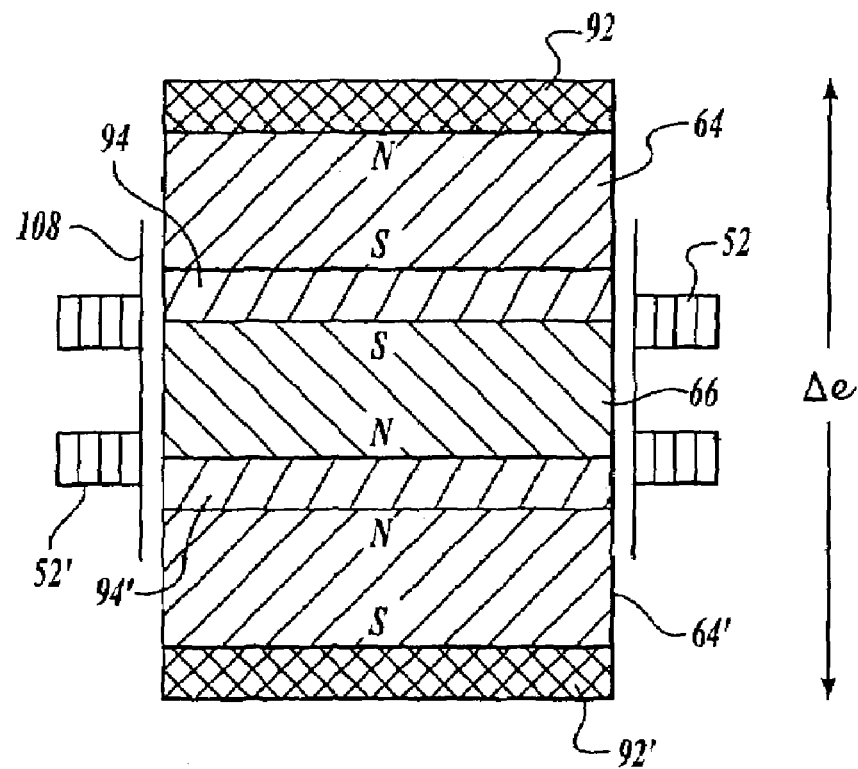

FIGS. 25 and 26 illustrate arrangements in which the magnet assembly includes several magnets provided in stacked arrangement, one on top of another. The magnets are arranged with like poles facing one another. Drive coils are available at each of the radially emanating magnetic fields. An optional former 108 connects these coils to provide joined motion. The magnet assembly may also engender combinations of magnets whose magnetizations are of a radial and axial orientation. (See FIG. 22.) Alternatively, the assembly may include only radially oriented magnets or only axially oriented magnets.

Figure 27:
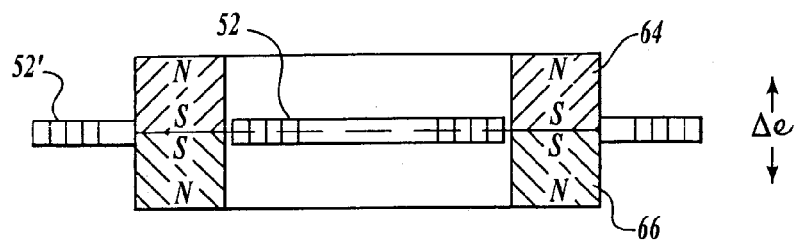
FIGS. 27, 28, 29, 30, 31, 32, and 33 are cross-sectional schematic side views of still further alternative embodiments of a transducer formed according to the present invention, illustrating various ring magnet configurations.
Figure 28:
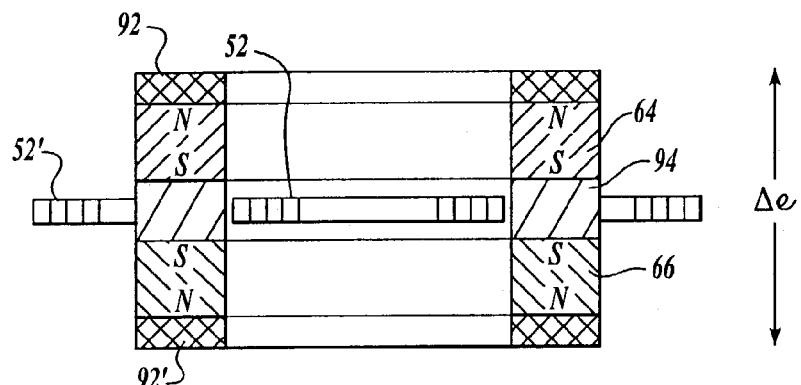
Figure 29:
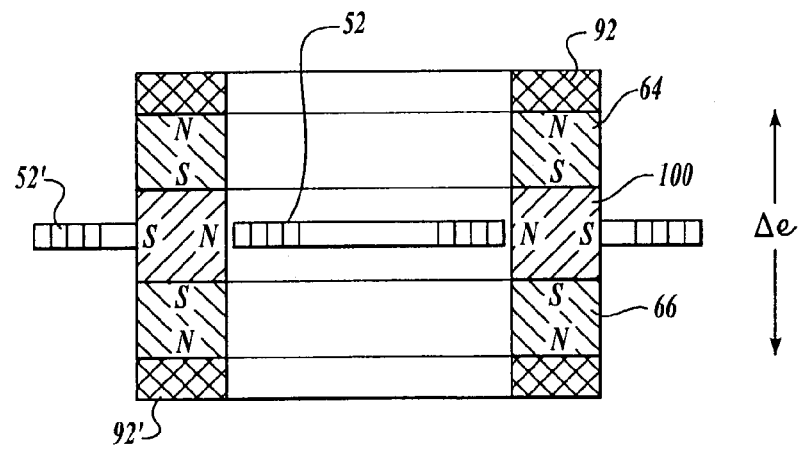
Figure 30:
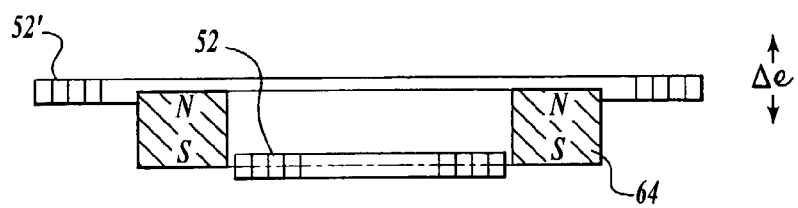
Figure 31:
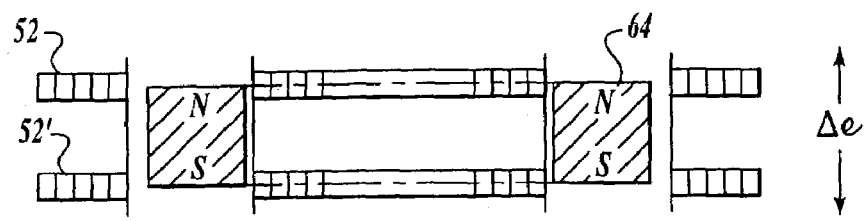

The above embodiments describe a drive coil surrounding a radially divergent magnetic field (i.e., fanning circularly outward). A second main embodiment includes a drive coil positioned within a radially convergent magnetic field (i.e., moving radially inward). Referring to FIG. 27, the magnet assembly includes first and second ring magnets that are permanently magnetized in their axial direction. In this embodiment, the ring magnets are placed flush, one on top of the other, with like poles facing each other. A divergent radial magnetic field is formed about the outer diameter of the ring magnets and a convergent radial magnetic field is formed about the inner diameter of the ring magnets. Drive coils may be placed in either or both of the emanating fields.

The coil wire cross sections may embrace any of the numerous geometries described herein, and they need not necessarily be alike when more than one drive coil is present. In the convergent magnetic field, the drive coil's outer diameter is slightly smaller than the ring magnets' inner diameter so that the coil can move freely inside the ring magnets along a vertical excursion path. In the divergent magnetic field, the drive coil's inner diameter is greater than the ring magnets' outer diameter. The drive coils remain close to the magnets but do not touch them or physically conflict with them. Because the magnet fields are strongest just outside of the inner and outer edges of the ring magnets, the coils are preferably placed in the closest proximity to the magnets as possible to take advantage of the greatest available flux density.

FIGS. 28–33 illustrate alternative embodiments similar to those described above with regard to disc magnets. Multiple or single ring magnets (radially or axially magnetized), inner and outer drive coils, flexible interface members, spacers, open spaces, end caps, axial disc magnets, and formers may all be used in numerous combinations to create magnetic fields of a particular shape and strength. FIGS. 27–33 show only a portion of the arrangements possible. In FIG. 32, the placement of the drive coil relative to a single radial ring magnet would be at the midheight of the magnet, which is the horizontal plane in which the flux density is greatest and offers greatest magnetic field symmetry about this plane.

Figure 34:
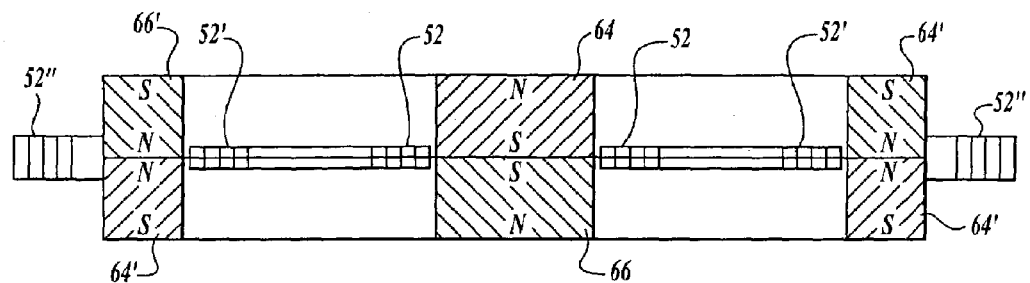
FIGS. 34, 35, and 36 are cross-sectional schematic side views of yet other alternative embodiments of a transducer formed according to the present invention, illustrating arrangements having concentric ring and/or disc magnets.
Figure 35:
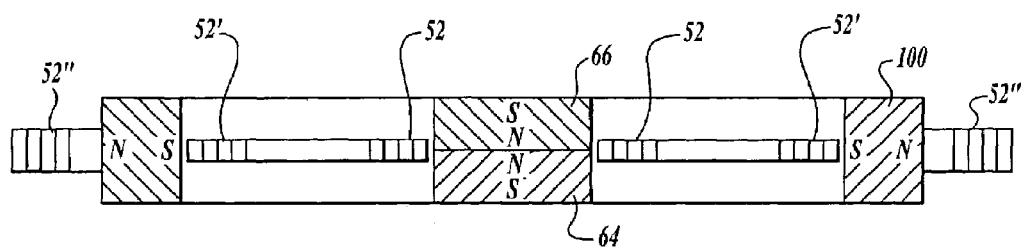
Figure 36:
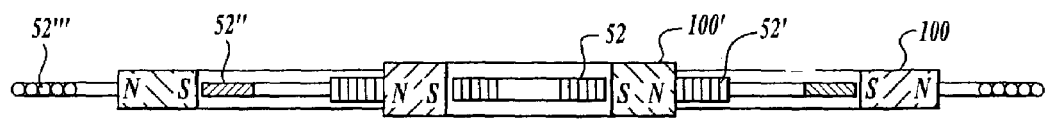

Referring to FIGS. 34, 35, and 36, multiple ring magnets may be used to create multiple diverging and/or converging radially emanating magnetic fields. It is also possible to provide magnet pairs of differing sizes and magnetic strengths as well. Each of these arrangements has a magnet assembly that includes concentric magnets or magnet pairs. In FIG. 34, the magnet assembly uses an axial disc magnet pair 64, 66 positioned within an axial ring magnet pair 64', 66'. Both the disc and ring magnets are positioned with like poles facing one another, though of opposite polarity (i.e., the disc magnets have south poles facing one another, while the ring magnets have north poles facing one another, or vice versa). As shown, there are three drive coils provided. One coil 52 is located about the outer diameter of the disc magnet assembly. Another coil 52' is located on the inner diameter of the ring magnet assembly, and lastly, a third coil 52" is found on the outer diameter of the ring magnet assembly. Shown in FIGS. 35 and 36, radial ring magnets are substituted for one or more of the concentric magnet pairs.

In the nonconcentric embodiments described above (see, for example, FIG. 2), the drive coil is immersed in an open field, because the magnetic circuit does not complete itself through the outer periphery of the coil. Stated differently, the flat ring coil is immersed in the magnetic monopole source of one or more magnets. Between the coil and magnet lies a single boundary. The outer periphery of the coil is unbound. If the magnetic circuit were closed, the region would be referred to as a dipole gap. The dipole gap would represent a closed field. In a closed field, both the inner diameter and the outer diameter of the coil are bound by the proximity of a magnet surface.

For embodiments having concentric magnets or magnet pairs, the magnetic field formed between the concentric magnets includes a region that acts as a nonuniform wide dipole gap. In this region, the start and return magnetic paths are radially generated and travel between opposite poles of the concentric magnets. In effect, the wide-gap radial field is composed of two effective monopoles of opposite polarity that together close their circuit in a flat horizontal plane, thus forming a nonuniform gap. Within this region, the opposite pole focuses and strengthens the flux density through the coil in a tighter horizontal pattern. Because of the need for a relatively wide drive coil, dipole gap region of the present invention is relatively wide. As the dipole gap increases in size, the uniformity of the magnetic flux therein decreases. Therefore, a wide gap offers a decrease in field uniformity. This is in contrast with the narrow-gap uniform dipole magnetic field of the prior art, which is not a consideration for the present invention transducer. Thus, the flat ring coil of the present invention is immersed in a nonuniform magnetic field—from either a closed-field (double boundary) magnetic assembly or open-field (single boundary) magnetic assembly. As stated above, many different magnetic arrangements are possible that form such a nonuniform field.

Figure 37:
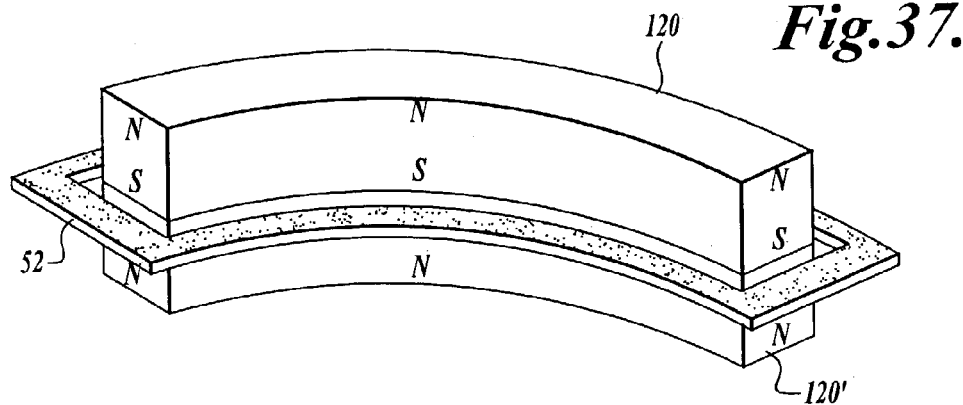
Figure 38:
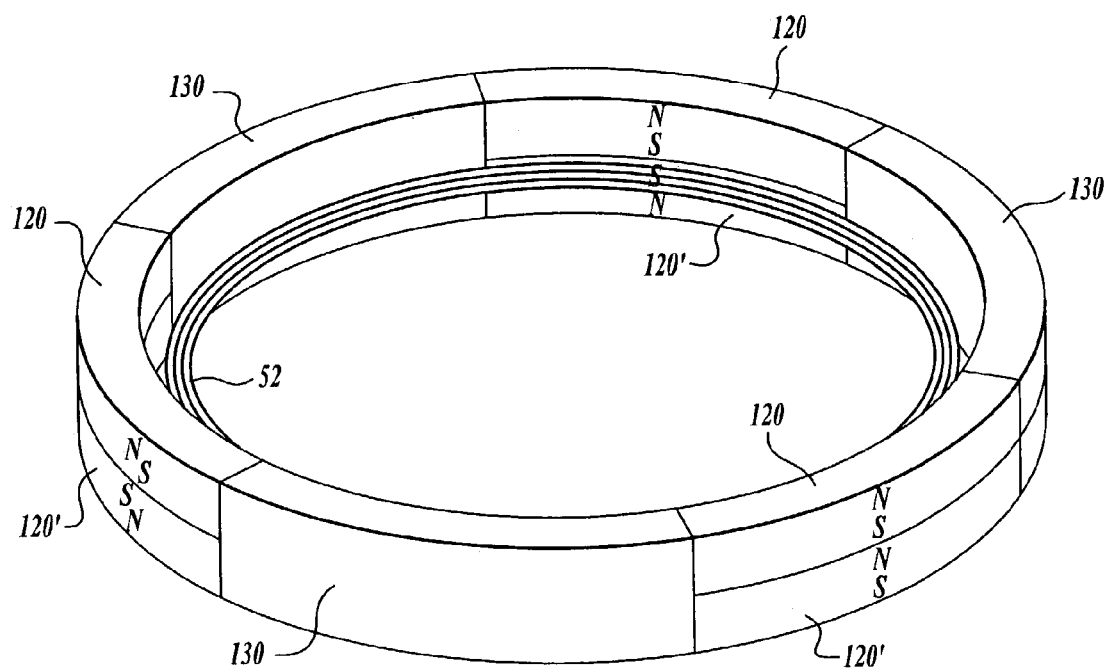
Figure 39:
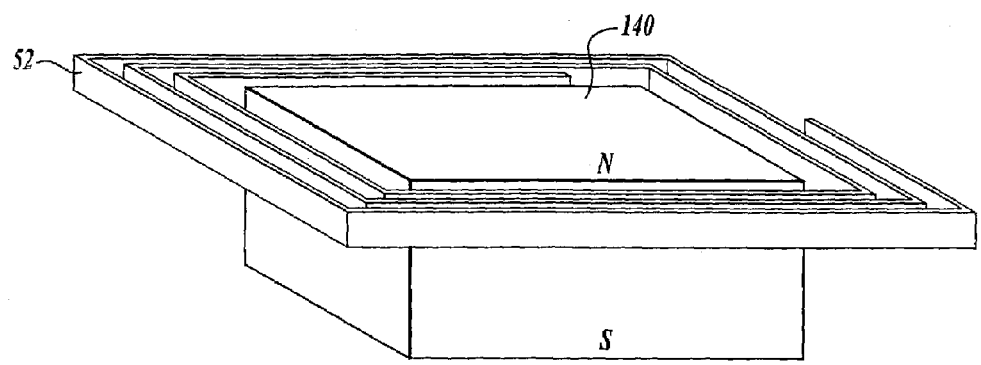
Figure 40:
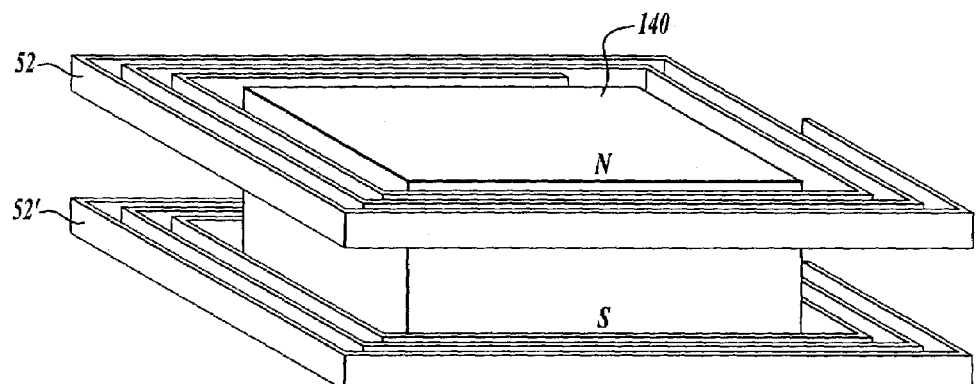
Figure 41:
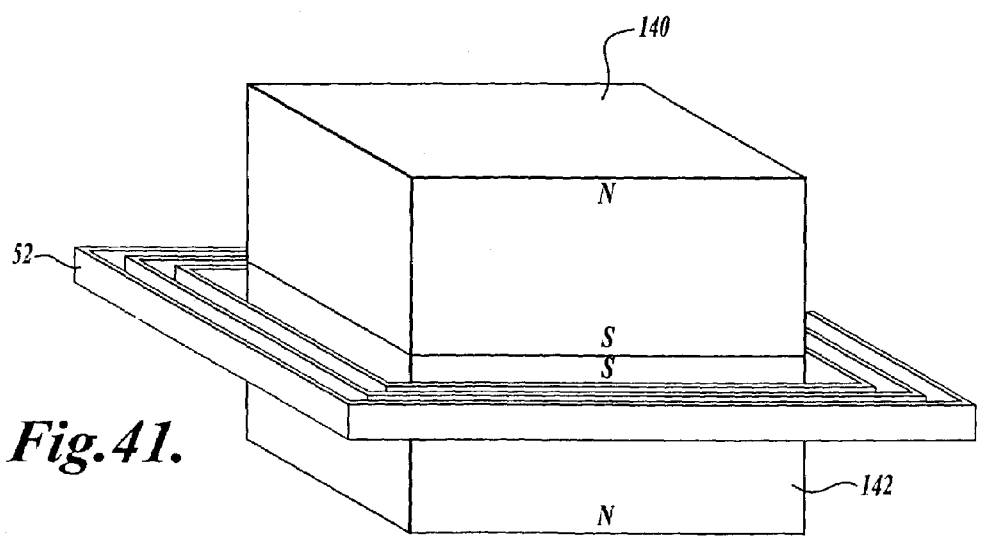
Figure 44:
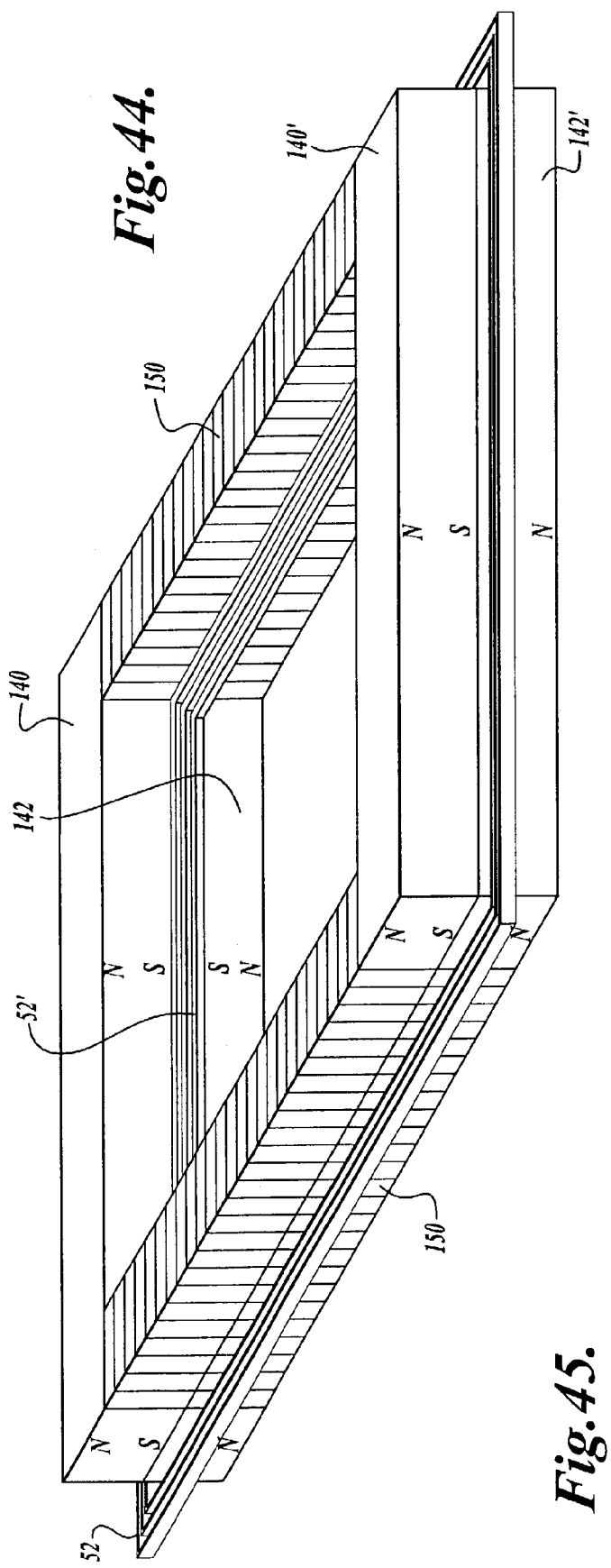

Various other magnet assembly shapes are possible. For example, FIG. 37 illustrates an arcuate magnet pair 120, 120' and a similarly shaped drive coil 52. FIG. 38 shows multiple arcuate magnets that are combined to form a generally circular form. In one arrangement, each arcuate segment is a magnet pair. In another arrangement, magnet pairs 120, 120' alternate between nonmagnetic arcuate material 130 spaced therebetween. FIGS. 39, 40, and 41 illustrate perspective views of square permanent magnets 140, magnet pairs 140, 142, and one or more square drive coils 52, 52'. FIGS. 42, 43, and 44 illustrate the use of rectangular magnets 140, rectangular magnet pairs 140, 142, and one or more rectangular drive coils 52, 52'. In the embodiment of FIG. 44, various nonmagnetic material 150 is placed between two bar magnet pairs to form a square ring shape. A square outer drive coil 52 is used about the total square, and a square inner drive coil 52' is used within the total square.

The magnet assembly may be supported by any number of conventional means. For example, the magnet(s) may be fixed to a cover plate with the drive coil connected to the plate via a spring or other compressible material. Further, because the transducer is useful in an acoustic device or in a switch or relay, it is envisioned that the drive coil may be attached to components such as a spider, diaphragm, outer interface, or flexible member (e.g., foam) that may be provided to act as a motion transmitter. For example, in FIG. 45, foam interface members 160 are used to attach the outer periphery of the drive coil to a support brace 170. This means of support attachment is, in general, applicable to both convergent and divergent magnet arrangements. As will be appreciated by those of skill in the art, numerous types of support means may be used. The uniqueness of the present invention transducer lies in its use of a flat ring drive coil placed in a radially emanating field. The support means is secondary and will depend, in part, on the transducer's intended use.

In addition, physically smaller transducers may be made with correspondingly smaller magnet assemblies. Because smaller magnets have smaller masses, they have potentially less inertia, and require less force for displacement. For this reason, a small transducer formed in accordance with the present invention may be constructed in a manner that holds the drive coil fixed while the magnet assembly oscillates, or alternatively, both the magnet assembly and the drive coil are allowed to oscillate. Experimental success has been found when both coil and magnet assembly are not held stationary, but move independently of support means, suspended as it were, so that the coil and magnet system freely interact with one another.

As will be appreciated from a reading of the above, the present invention transducer is designed to maximize coil excursion while at the same time shortening the vertical dimension of the transducer, making it flatter overall. The transducer is axially symmetric about its vertical axis, and bilaterally symmetrical in the horizontal plane perpendicular to the vertical axis. Within the integrity of this design, devices can be constructed to cover a wide range of frequencies, from the very low, up through ultrasonic and into the radio frequency spectrum.

The symmetry is important for maintaining linearity of response through a broadband spectrum, as well as for keeping signal distortion to a minimum. The physical symmetry in the appearance of the device is an implicit reflection of its magnetic field symmetry. This means that the bilateral magnetic field symmetry above and below the horizontal plane helps create a smoother signal throughout coil excursion. Many of the prior art transducers suffer signal distortion from a lack of symmetry in the magnet assembly and pole piece architecture. These prior art transducers have axial symmetry and no symmetry across the horizontal plane, whereas the magnet assembly of the present invention transducer is symmetric above the coil and below the coil. The placement of the coil is represented by the horizontal plane itself, and divides the magnetic assembly into two equal halves. One half is above the coil, and the other half is below it such that the coil is in the middle of the magnet system, either inside the assembly or surrounding it. The middle of the magnet system is where the greatest flux density is located for the radial field for magnet assemblies containing two or more axially magnetized magnets or for magnet assemblies having one or more radially magnetized magnets. The horizontal plane thus represents the strongest part of the field. This is why the coil is placed in this region—to receive the greatest field strength from the magnet assembly. In this position it is also in symmetrical balance with regard to field line geometry. The flat ring coil reduces the size and weight of the magnet assembly and dramatically increases performance by replacing the cylinder coil in radially generated magnetic systems.

With regard to the prior art, the present invention transducer is a returnless path device and, in most practical examples of the invention, a repulsion field returnless path transducer. The reason for this nomenclature is that the device operates in the radially generated magnetic field of a single pole where the opposite pole does not contribute to the coil. That is, the opposite pole is not in line with the plane of the coil and, in order to close the magnetic circuit, the flux lines may have to curve their return path by 180 degrees in the opposite direction that they traveled through in the coil, and at some distance away. A conventional returnless path does not make use of both poles for a coil interaction. A returnless path transducer has a coil that interacts with the magnet field one pole at a time. They do not use start and return paths simultaneously, but at different times. The effective monopole is a specific region of returnless path—it is the strongest part. In nonreturnless path devices, the coil is immersed in a uniform dipole gap. The coil feels the influence of both the start and the return path.

Each embodiment of the present invention transducer takes advantage of radially generated magnetic fields or sections of magnets where radial lines are found or generated. It is important in the present invention that a flat ring coil is immersed in a radial field and that the coil is flat, i.e., of a width that is equal to or greater than the coil's height. The present invention transducer is then the arrangement of a flat ring coil positioned to act most efficiently in a radially generated magnetic field. The purpose of having a radial magnetic field through a flat ring coil is to ensure that all windings of the coil are simultaneously immersed in the emanating flux lines at the same time. Especially in the case of a flat wire winding with the broad side of the wire parallel with the vertical axis, the greatest number of flux lines are able to traverse the windings of the coil when the coil is immersed in the radial field.

The greater the surface area of contact that wires can have with each other in a group of tightly packed windings, the more the already existing small capacitance increases. In flat wide wire or ribbon wire coils, the increase in capacitance is substantial. This adds an element of capacitive reactance to the coil. As frequency increases in the transducer, the capacitive reactance decreases. The two are mutually inversely related to each other. Reactance is that which adds more resistance to the already existing direct current resistance in an alternating current system. Thus, the flat wire coil decreases its own resistance at higher and higher frequencies. This renders the coil more efficient. Experiments reveal that this inherent quality of the flat ring coil of the present invention offers performance advantages.

A flat ring coil also offers advantages over the many-layer cylinder coil. The flatness of the coil itself and the fact that it is not a solid disc coil but a ring, tends to decrease inductive reactance. The greater the outer diameter of a coil, the less its inductive reactance. Since each successive winding on a flat ring coil continually extends the diameter of the coil, the inductive reactance continues to decrease as windings increase. This property helps keep resistance down to a minimum for the increased resistance that additional windings contribute to the coil.

Just as frequency affects capacitive reactance, so too does frequency affect inductive reactance. However, for inductive reactance, the change of frequency varies in direct linear proportion. This means that inductive reactance is lowest at low frequencies, and contributes a higher resistance at high frequencies.

The overall lowered resistance throughout the frequency ranges of the coil caused by the physical construction of the coil, the capacitive reactance, and inductive reactance, all contribute to decreasing the coil's counter electromagnetic force (CEMF) in the electromagnetic system of the transducer. The reduced CEMF diminishes damping effects, which improves performance by giving the device more power during operation.

The flat ring shape of the coil, the biaxial symmetry of the magnetic assembly, the increased capacitance, and the decrease in inductive reactance, create a synergy that produces a more linear and distortion-free signal relative to cylinder coil and pole piece transducers. The addition of electronic components is no longer as imperative to filter signals. These extra components contribute to unwanted degrees of phase shifting. Phase shifts reduce the strength of the output signal because destructive wave interference has a cancellation effect on the waveform. The present invention coil is essentially thus self-regulating and self-filtering throughout its broadband spectra.

Other advantages of the present invention are that heavy massive pole pieces can be completely eliminated. Pole pieces are the source of detrimental effects. They cause eddy currents, signal rectification, and heat buildup. The eddy currents that are created in the pole pieces by induction cause heat buildup within them. This heat is transferred to the coil. This additional heat increases the direct current resistance of the coil, which impedes current flow and generates even more heat as a consequence. This, in turn, dramatically reduces power output and shortens the life of the coil. An overheated coil may burn out or have a very short lifespan. Another pole piece problem is that the coil is continually magnetically pulled to the ferrous metal regardless of the coil's signal polarity. The result of this is undesirable signal rectification as well as other higher order harmonic distortions.

Overheating of the coil can also come from the very narrow gap it is seated in. Heat transfer into the ambient air becomes difficult because of the confined space. The restricting gap area prevents the coil from throwing off its excess heat. Unfortunately, the cylinder coil may be destined to remain entombed within a suffocating and very massive ferrous environment.

By contrast, the flat ring coil of the present invention is out in the open air. Excess heat is immediately dissipated. The coil's oscillatory motion allows the coil to cool itself naturally by fanning itself continually during operation. An added benefit for its cooling is that, because the coil is flat, most or all of its windings are in direct contact with the air. There are no heavy layers of windings preventing the inner layers from being in contact with the outside. Wires deeply embedded in a coil have little opportunity for heat transfer, especially if all the surrounding windings are running hot. Since the present invention coil can dissipate heat more easily, it can absorb more wattage. The larger ring diameter also allows it to absorb additional power.

The flat ring coil in a radially emanating magnetic field thus offers greater performance than its cylinder counterpart, without the losses and signal distortions, and is many times lighter in weight. Experiments in weight versus power output reveal that the present invention transducer is found to be several times more powerful than conventional pole piece transducers (as measured in root mean square power rating). The present invention transducer does not suffer from magnetomotive or electromotive losses to the extent that other existing transducers do.

The present invention transducer also offers a number of magnetomechanical advantages. The length of a cylinder coil in some prior art ferrous pole piece transducers will prevent the cylinder coil from having all of its windings in the magnetic field at the same time as it moves up and down in the narrow uniform dipole gap established by the pole pieces of the assembly. At some point, the top and/or bottom end of the cylinder coil will fall short of the magnetic field, since it often happens that much of the coil extends past the edges or corners of the pole pieces during reversal of its direction when nearing excursion boundaries. This creates an uneven distribution of flux densities along the coil axis and represents a common source of signal distortion. The fringe fields that exist at the edges or corners of the pole pieces amplify these distortions, because these fringe field lines are no longer orthogonal to the vertical axis of the cylinder coil (as they normally are in the narrow pole piece gap), but instead are formed at angles that depart from orthogonal. As the coil nears these regions it modulates the fringe fields, distorting the signal even more. In radially generated magnetic fields, cylinder coils fare even worse.

In radial systems, the short height of the present invention flat ring coil allows it to have essentially all of its windings in a field density region whose flux lines permeate the coil, in essence, at the same angle at the same time, as it travels along the periphery of its magnet assembly. This is not the case for a prior art cylinder coil, where flux lines of many different angles touch the windings at any given moment. Although the flux density decreases through each successive winding of the flat ring coil in a radial system as the distance from the magnetic monopole increases, the flux line angle remains nearly the same through the coil. In contrast, a cylinder coil experiences a variety of flux line angles through the length of its windings.

As a consequence, the flat ring coil does not have its windings in a magnetic field of flux lines of different angles at a given time. This prevents the coil from simultaneously experiencing flux lines of such differing angles that would eventually neutralize the magnetic field to zero at some point during the coil's excursion, as happens in the prior art cylinder coil. Stated differently, the flat ring coil is never in the "crossfire" of different angular field regions that cause destructive interference, because the flat ring drive coil has only a minor extension in the vertical axis. The flat ring coil may go through a zero field density, but not from conflicting field lines. For this reason, the flat ring coil experiences minimal distortion through its travel distance. There is no neutralization of magnetic fields during its performance due to destructive interference of conflicting flux lines. The waveform remains clean and the coil's response becomes more linear.

Since the flat ring coil receives flux lines of the same angle throughout its windings at any given time, there are no detrimental fringe field modulations as there would be for a cylinder coil were it placed in a radial system. The advantage of the flat ring coil is that it has only a minor extension in the vertical axis. Thus, the fringing phenomenon, which is detrimental to the cylinder coil, becomes useful for the operation of the flat ring coil. It is also by taking advantage of the fringing effect that radial magnetic fields are created from axially oriented magnets, whether the magnet assembly is composed of just one magnet or several magnets stacked together for the present invention transducer system.

As the flux lines fan out radially away from the magnetic monopole, the weakening field is felt in each outwardly successive winding of the flat ring coil, but the field remains of the same angle throughout the circumference and windings of the entire coil for a given moment. The flat ring coil is subject to experience quantitative changes of flux density in a given instant and not to qualitative changes of flux densities. By "qualitative" is meant flux lines of varying angles as they permeate the drive coil. By "quantitative" is meant the varying degree of flux density or field strength as distance away from the source increases, for flux lines of a given angle. The cylinder coil is subject to both qualitative and quantitative changes in flux densities for a given time throughout its windings. Therefore, the flat ring coil is essentially subject only to quantitative field changes. This removes the qualitative parameter from influencing the coil and consequently removes a source of signal distortion, which the cylinder coil cannot avoid.

The flat ring coil therefore responds more uniformly to magnetic field fluctuations surrounding it. The cylinder coil, by contrast, responds nonuniformly to magnetic field fluctuations surrounding it because of its physical extension in the vertical axis, causing the cylinder coil to be affected simultaneously by field lines of varying angles. It is this nonuniform response to the magnetic fields in the cylinder coil that causes additional fluctuations in the Bli cross-product coming from the qualitative parameter responsible for the additional distortions of signals, where B is the magnet flux through the coil, l is the length of the wire in the field, and i is the current in the wire. This detrimental parameter is much less evident in the flat ring coil of the present invention and thus the present invention offers a cleaner and more pure signal.

The present invention transducer also provides an advantageous excursion path for its flat ring drive coil, particularly regarding avoidance of a runaway excursion. In the present invention transducer, the permanent magnet return path does not contribute to the activity of the coil at the same time that the start path does. The return pole is too far away from the coil to have a direct effect on it, and requires travel time for the coil to be in its proximity. The field lines of the return pathway are not in the same radial or horizontal plane as the start path. The start path effective monopole or "radiation field" is in the middle of the assembly (for the case of an axial pair magnet assembly or a radial magnet assembly). Here the coil would otherwise take advantage of the Bli cross-product if both start and return paths were in a straight line, as in the example of a uniform dipole field gap between ferrous pole pieces. The narrow dipole gap for the conventional cylinder coil is in both the start and return pathways simultaneously and remains so during its excursion.

In the axial magnet pair or radial magnet arrangements, the drive coil pushes onward along its vertical axis, away from the radial field in the middle of the assembly and toward its polar end. As the coil moves along, it encounters another radial field, but of opposite polarity. This field represents the return path of the magnetic circuit, whose source is the polar end face of the magnet system, one each on the opposite sides of the midassembly. This end field acts on the coil by braking its speed and holds it by magnetic attraction until the current in the coil reverses polarity. The coil is then pushed back in the opposite direction toward the middle of the assembly. It continues its journey until it reaches the other end field on the opposite side, if it has enough momentum, or it will return to the radial field in the opposite polarity middle region before it returns back to the end pole where the end field again brakes the coil's momentum and the cycle starts all over again. The braking of the coil helps prevent the coil from incurring damages due to overexcursion, i.e., overextension into regions beyond the excursion boundary, causing a runaway phenomenon.

In the axial magnet pair or radial magnet arrangements, the flat ring coil typically does not travel much beyond the plane of the open pole piece on the ends of the assembly. In contrast, the cylinder coil may brake half or more of its mass extending beyond the pole face end if it were placed in a returnless path magnet assembly. Due to magnetic field cancellations experienced by the cylinder coil caused by field lines of many different angles, the coil may not be as easily stopped. The cylinder coil will have greater risk of being hurled out of the magnet assembly as a consequence and an uncontrollable runaway may take place. In the present invention, the flat ring coil is not thrown out of the assembly but, rather, held magnetically just above the pole face end. It then reverses direction when current polarity changes.

Since the flat ring coil has only a minor physical extension in the vertical axis, the strong field holding it will not be weakened by countering field lines of opposite polarity and differing angles, as happens to the cylinder coil. Thus, the qualitative parameter regarding conflicting field angles is mostly removed from the flat ring coil because of its minimal vertical extension.

The braking phenomenon on the flat ring coil helps obviate the need for placing physical restraints on the coil to limit its movement within its excursion boundaries. Runaway excursion is especially prevalent at low frequencies where the excursion path is the greatest. The present invention transducer reduces this major cause of coil destruction, magnetically, without physical means that may cause overdamping. Therefore, power output is not compromised. In some embodiments of the invention this "magnetic harness" may eliminate any need for an interface material to secure the drive coil to the magnet assembly.

All the above advantages of the flat ring coil over a cylinder coil in returnless systems or more generally radial systems make the present invention transducer most desirable as a new technology for applications in many different fields.

In summary, the device is designed to maximize coil excursion while at the same time shortening the vertical dimension of the transducer, making it flatter overall. It is axially symmetric about its vertical axis, and bilaterally symmetric in the horizontal plane perpendicular to the vertical axis. As such, the device can be constructed to cover a wide range of frequencies, from the very low, up through ultrasonic and into the radio frequency spectrum. The symmetry is important for maintaining linearity of response through a broadband spectrum, as well as for keeping signal distortion to a minimum. The bilateral magnetic field symmetry above and below the horizontal plane helps create a smoother signal throughout coil excursion. The flat ring coil reduces the size and weight of the magnet assembly and dramatically increases performance by replacing the cylinder coil in radially generated magnetic systems. Flux lines of the same angle permeate the flat ring coil whereas, in the cylinder coil, flux lines of different and opposite angles prevail, adding interfering parameters.

The present invention transducer is especially useful in speakers 196 and microphones 198. FIGS. 46–54 illustrate various speaker embodiments. In general, bilateral symmetry (electrical, magnetic, and mechanical) helps improve speaker performance, and preferred components include such symmetry. FIGS. 55–64 illustrate various microphone embodiments. In speakers and microphones, the assembly includes a diaphragm for transmitting or receiving sound based on the relative movement between the coil and the magnet system. As will be appreciated from a reading of the description below, the speaker and microphone configurations will vary according to the particular applications and many of the previously-described features may be used.

Figure 46:
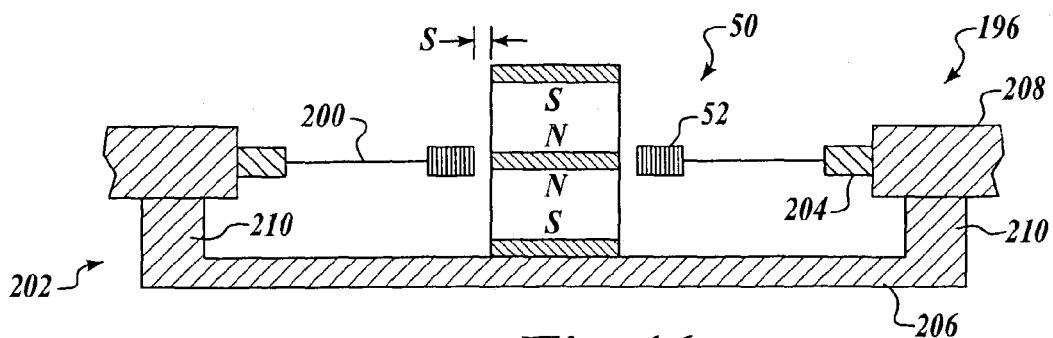
FIG. 46 is a schematic side view of one embodiment of a speaker formed in accordance with the present invention.

Referring first to the embodiment of FIG. 46, the speaker includes a magnet assembly 50, a conductor 52 (drive coil), a diaphragm 200, a support 202 (or base), and a surround 204. The magnet assembly and coil are arranged as previously described whereby the coil is immersed in a laterally-emanating magnetic field. As before, a space, S, is left between the coil and the magnet assembly so that they may move relative to one another without conflict. This space is preferably as small at technology permits.

The support is used to stabilize the speaker. In FIG. 46, the support 202 includes a brace 206 and an enclosure 208. The brace connects to the magnet assembly and to the enclosure. The enclosure is a flat, rigid panel within which the other components are held. The brace includes one or more feet 210 that keep the magnet assembly at the appropriate location relative to the diaphragm and coil. FIG. 46 illustrates a single brace, however, it is possible to have both upper and lower braces that sandwich the surround edges in between. See, for example, the enclosure of FIG. 57.

The diaphragm is a ring-shaped object preferably made of a stiff lightweight material or materials. The stiffness of the diaphragm may be enhanced by the addition of ribs or concentric circles 212. The coil is connected to the diaphragm, at a location near the magnet assembly. See FIG. 66.

Figure 47:
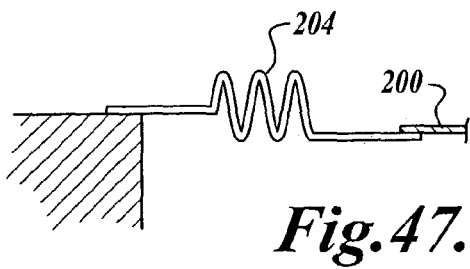
FIGS. 47, 48, and 49 are schematic side views of example surrounds formed in accordance with the present invention.
Figure 48:
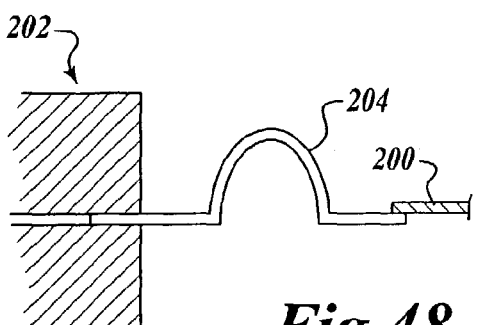
Figure 49:
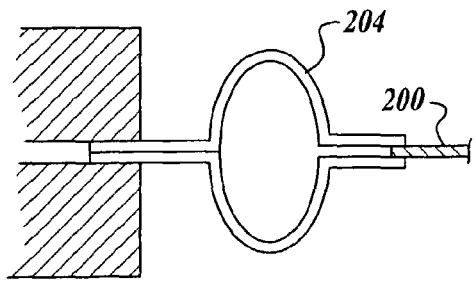

A ring-shaped surround 204 is attached to the enclosure about the outer periphery of the diaphragm. The surround is generally a flexible member connecting the diaphragm to the enclosure in a manner that allows the diaphragm to move relative to the enclosure. In one embodiment the outer perimeter of the diaphragm is adhered to the inner edge of the surround. In FIG. 46, the surround is shown simply as a foam ring having a rectangular cross-sectional shape. In FIG. 47, the surround is a ring of flexible material in the shape of a lateral spring. In FIG. 48, the surround is a ring in the shape of a dome. FIG. 49 illustrates a dual dome configuration. By way of further example, an accordion-shaped surround, such as that described in U.S. Pat. No. 3,019,849 (incorporated by reference herein), may be used. During use, the surround allows the entire diaphragm to translate within the available excursion path, and not just the portion of the diaphragm nearest the coil.

Figure 50:
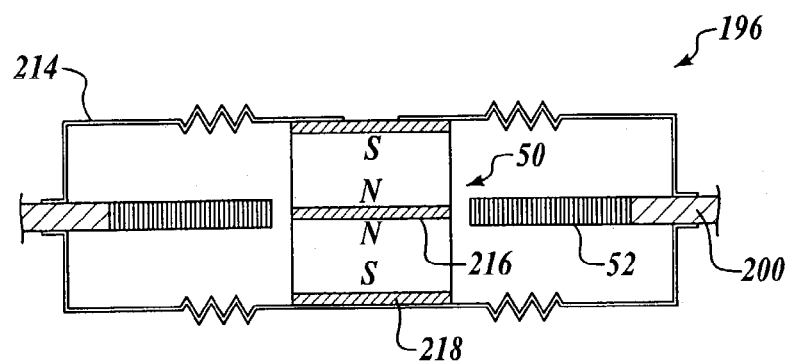
FIGS. 50 and 51 are schematic side views of an alternative speaker embodiment formed in accordance with the present invention and having movable magnet assemblies.
Figure 51:
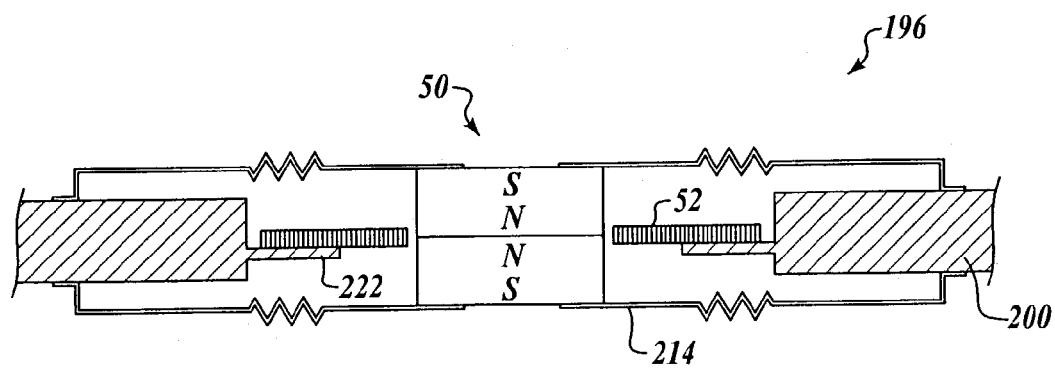

Alternative speaker embodiments are shown in FIGS. 50 and 51. In these arrangements, both the coil and the magnet assembly move. One or more spiders 214 connect the magnet assembly to the diaphragm. For the lower frequencies, two spiders may be helpful to physically control the diaphragm and coil. In FIG. 50, both upper and lower ring spiders are used, connecting the inner edge of the diaphragm with the magnet assembly. A soft iron ring 216 may be positioned between the magnets to help focus the magnetic field lines. Similarly, iron or brass discs 218 may also be attached to the top or bottom of the disc pair. It is further possible to use a bismuth disc above or below the magnet assembly in order to shield it magnetically. In FIG. 51, the diaphragm is made of a compressible material. The inner periphery of the diaphragm is compressed to make it stiff. The coil is attached to this stiffened portion 222.

Figure 52:
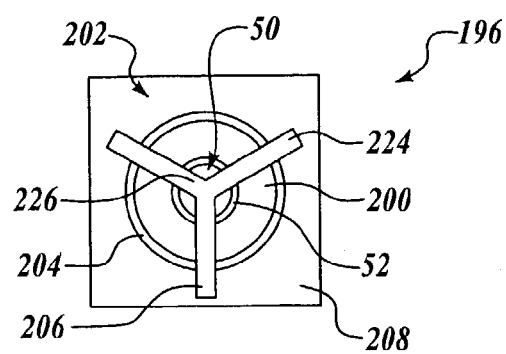
FIG. 52 is a schematic plan view of an example speaker illustrating an embodiment of a support.

FIG. 52 is a schematic plan view of an example speaker embodiment, illustrating a support 202 formed as a combination of an enclosure and a brace. The brace supports the magnet assembly and the enclosure supports the surround and the diaphragm. The brace shown has three arms 224 emanating from a central point 226. The magnet assembly is affixed to the central point, and the distal ends of the arms include feet 210 which attach to the enclosure just outside of the area of the surround.

Figure 53:
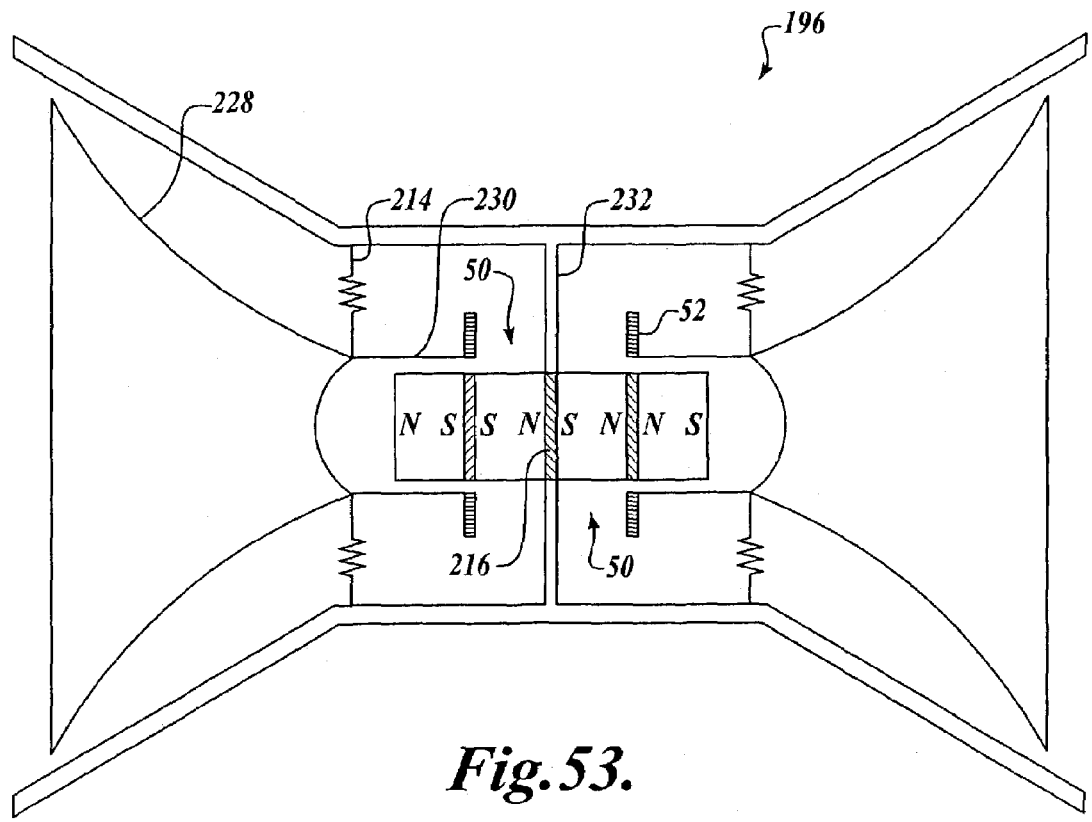
FIG. 53 is a schematic side view of two speaker assemblies, each having a transducer of the present invention inserted in lieu of a conventional magnet system and cylinder coil.

It is possible to use the transducer with known speakers as a replacement part. See, for example, FIG. 53 in which a speaker assembly is shown having a transducer of the present invention inserted in lieu of a conventional magnet assembly and cylinder coil. FIG. 53 is further modified to include two speaker assemblies placed back-to-back. In this embodiment, a speaker cone 228 is attached to a former 230. The cone and former translate in and out and are supported by a spider 214. The former moves telescopically over a magnet assembly. A ring coil 52 is connected to the outer surface of the former at the location of the magnetic field emanating from the magnet assembly 50. The magnet assembly is attached to a basket 232, preferably with an optional ferrous disc 216 therebetween which is attached to the basket.

It is also possible to arrange the speaker of FIG. 53 so that the magnet assembly is movable and the coil is stationary. In such arrangements, the former is connected to the magnet assembly. The magnet assembly is unattached to the basket. The coil is supported by a brace against the basket sidewalls.

Regardless of the arrangement, in either a cone or diaphragm system, or monopolar or bipolar magnet assembly, care should be taken to ensure a design that avoids any canceling sound effect.

Similarly, it is possible to arrange multiple diaphragms in vertical positions. See, for example, the embodiment of FIG. 54, in which the speaker is configured to produce sound in two opposite directions using two different diaphragms 200.

Figure 54:
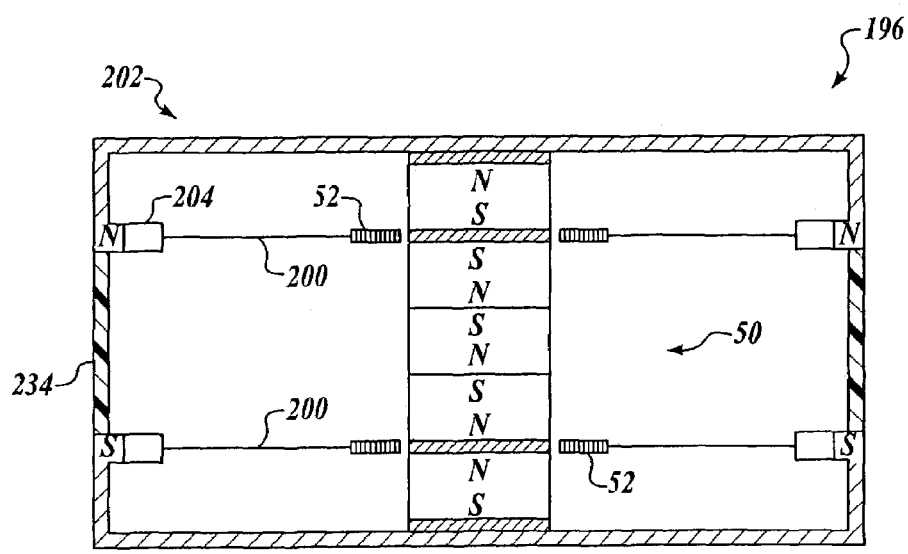
FIG. 54 is a schematic side view of a motor/generator arrangement having dual transducers and diaphragms.

The magnet assembly may be two bipolar magnet assemblies placed with opposite ends contacting. FIG. 53 essentially illustrates such an embodiment as applied to a cone-shaped diaphragm of conventional speakers. This arrangement has a soft steel spacer (or other material) between opposite pole magnet pairs. The magnet assembly may be two bipolar magnet assemblies with an optional spacer magnet therebetween (as shown in FIG. 54). Alternatively, the magnet assembly may comprise two monopole systems with a spacer magnet therebetween. In each of these embodiments, the support preferably includes a non-magnetic component 234 part and parcel of the support at locations between the diaphragms in order to lessen any interference.

Figure 55:
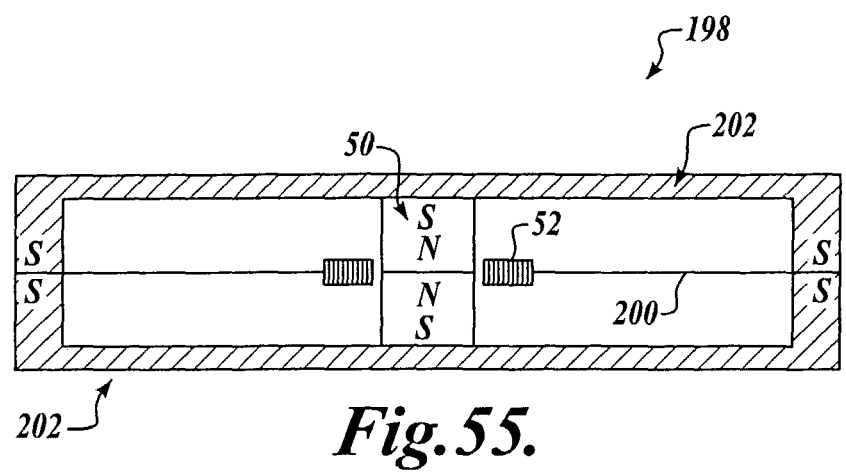
FIGS. 55, 56, and 57 are schematic side views of embodiments of a microphone formed in accordance with the present invention, each having a stationary magnet assembly and a movable diaphragm.

Referring now to microphones, many known microphones are simply smaller versions of conventional speakers, operated in reverse (i.e., as generators). Referring to FIG. 55, a first embodiment of a microphone is shown encased in upper and lower circular supports 202. The supports define an interior space within which the system is housed. In the embodiment shown, the magnet assembly is bonded to the inner surfaces of the supports. A diaphragm 200 is sandwiched between the supports and includes an inner opening having an inner periphery. A coil 52 is connected to the diaphragm near this opening. (As discussed above, the coil can attached to the diaphragm using various methods and at various locations.) As assembled, the coil is located near, though not contacting, the magnet assembly. The diaphragm 200 is generally made of a light weight stiff material capable of accommodating oscillations while still providing adequate coil support. The diaphragm may include concentric ribbing or other shape-enhancing features 212, as needed. Such features provide stiffening in the body of the diaphragm as well as provide the function of a surround at the outer periphery of the diaphragm to increase excursion. In this regard, the surround may be built into the diaphragm. The surround is an optional component, since the diaphragm oscillations of the microphone are relatively weak, and the coil does not require a large excursion path in order to be effective.

Figure 56:
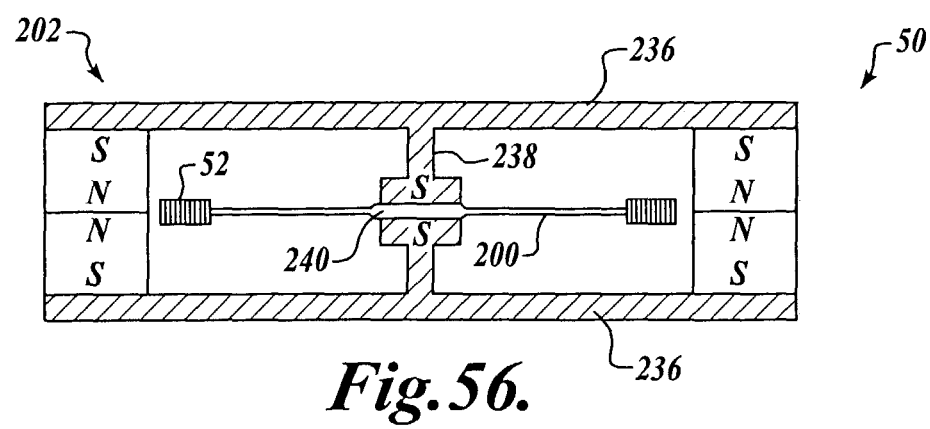

FIG. 56 illustrates another embodiment of a microphone formed in accordance with the present invention. In this device, the support includes upper and lower circular components 236. The magnet assembly includes a pair of axially-magnetized ring magnets oriented in axial alignment and sandwiched between the upper and lower components 236. Each component includes an inner support arm 238 extending inward from the component inner surface. The diaphragm is circularly formed with a center portion 240 that may be thicker than the other diaphragm areas. The thicker center portion is fixedly held between the inner support arms of the upper and lower components. A coil is connected to the diaphragm about its outer circumference and is held in close proximity to the ring magnet assembly. An optional built-in surround or ribbing (not shown) may be used about the center portion to facilitate diaphragm oscillation.

In either FIG. 55 or 56, additional magnetic components may be used to help focus the magnetic field. For example, in FIGS. 55 and 56, the support is made of a magnetic material. Further, a ferrous disc may be used within the magnet assembly itself. See FIG. 57.

Figure 58:
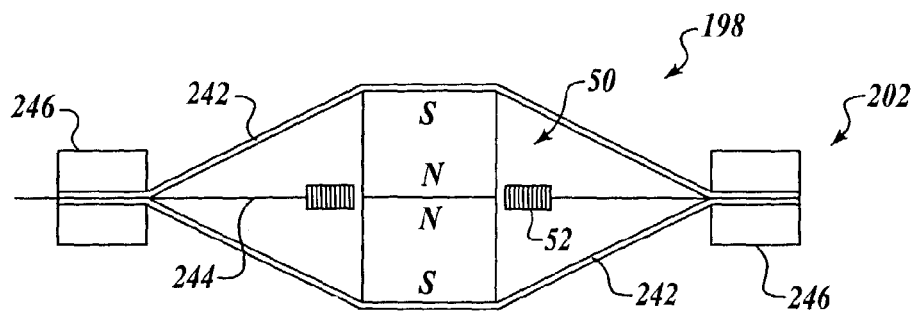
FIG. 58 is a schematic side view of an alternative embodiment of a microphone formed in accordance with the present invention and having a movable magnet assembly.

An alternative microphone arrangement is shown in FIG. 58 in which the coil 52 is held stationary, while the magnet assembly 50 is allowed to move relative to the coil. In such cases, the diaphragm 200 is attached to the magnet assembly in the form of opposed circular tarps 242 placed about the magnet assembly. The coil 52 is held on a stiff support 244. The ends of the support and the ends of the tarps are clamped between two support rings 246.

Figure 57:
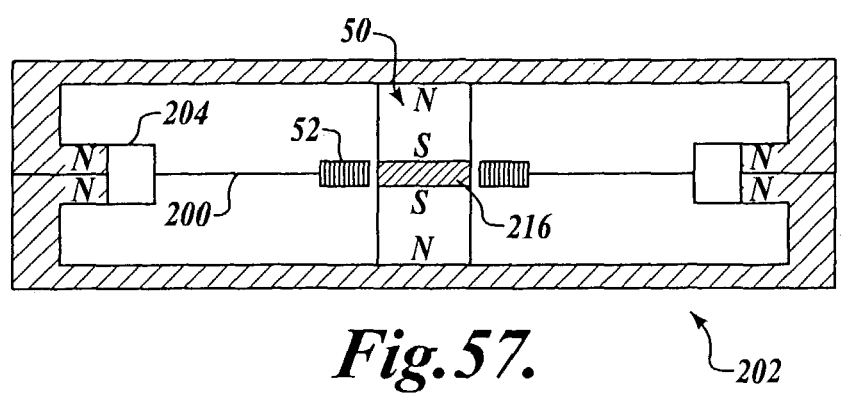
Figure 62:
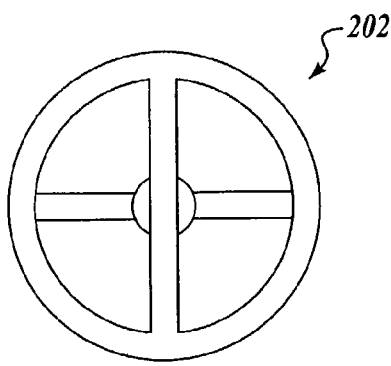
FIGS. 62, 63, and 64 are schematic plan views of example supports.
Figure 63:
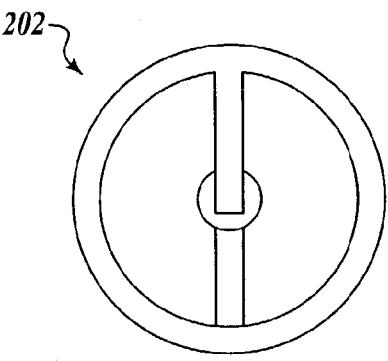
Figure 64:
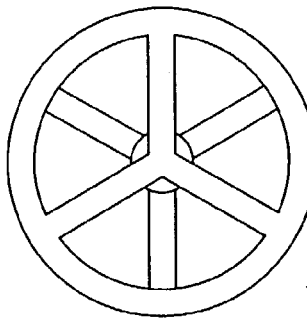

The supports of FIGS. 55, 56, and 57 may include openings to allow sound to travel to either side of the microphone and move the diaphragm. In this way, these arrangements may be made two-directional, or "bipolar", since they respond to sound coming from either side. FIGS. 62, 63, and 64 illustrate various configurations of such enclosures.

Figure 59:
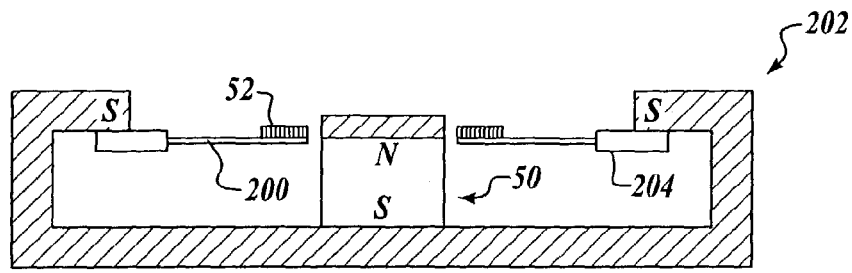
FIGS. 59, 60, and 61 are schematic side views of various monopole embodiments of a microphone formed in accordance with the present invention.
Figure 60:
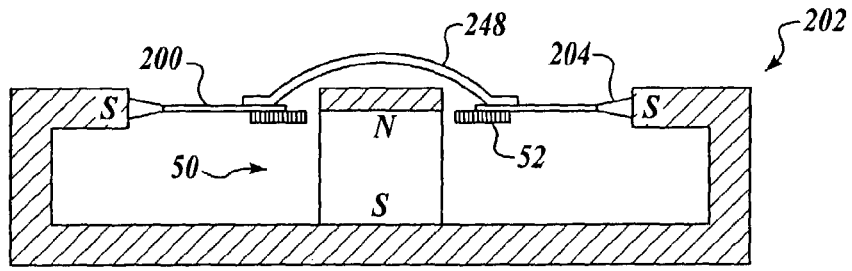
Figure 61:
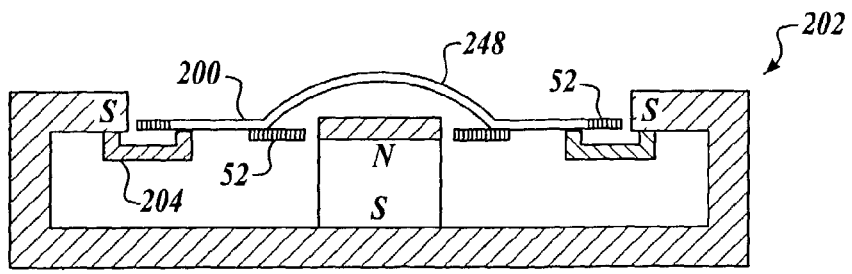

FIGS. 59, 60, and 61 illustrate further embodiments of microphones formed in accordance with the present invention. In each of these arrangements, the magnet assembly consists of a single axial magnet attached to a lower magnetic support 202. These arrangements are therefore referred to herein as "monopole" systems because they have only a single magnet pole face producing the majority of the magnetic field. In addition, these systems are generally effective only for responding to sound from a single direction.

The lower support includes an inwardly-oriented circular side flange 247. The support is a unitary object formed from a magnetic material. The pole at the distal end of each flange is opposite the pole value on the magnet's upper pole face. Because the magnet assembly is weaker overall, these arrangements may include a ferrous disc attached to the upper magnet pole face to focus the magnetic field. These arrangements may also include a surround between the flanges and the diaphragm to enhance the movement of the diaphragm. Further, it is possible to use a ferro fluid (iron held in a suspension) in the present invention, as appropriate.

The surround 204 may be any of a number of different types. The surround of FIG. 59 is a foam ring. Alternatively, concentric ribs on the outer circumference of the diaphragm may serve as suspension attachments. See, for example, FIG. 66. The surround of FIG. 60 is a gel or gel foam ring. The surround of FIG. 61 is a rubber ring having a U-shaped channel.

One or more moving coils 52 is attached to the diaphragm 200 at a location immersed in a magnetic field. In FIGS. 59 and 60, such locations are near the central single magnet outer pole face. In FIG. 61, there is a second coil located at the outer circumference of the diaphragm, near the magnetic material of the support flanges. One lead goes to the inner coil, which is then connected to the outer coil, which supplies the second lead.

FIGS. 60 and 61 illustrate an optional dome 248 placed over the central single magnet. The dome increases the surface for incoming sound and is attached directly to the diaphragm. The dome is preferably made of the same stiff material as the diaphragm, and may be made separate from or unitary with the diaphragm (as in FIG. 61). As will be appreciated from a reading of the above, monopole designs may be combined to form bipolar configurations. In such combinations, a dome would be unnecessary.

Figure 65:
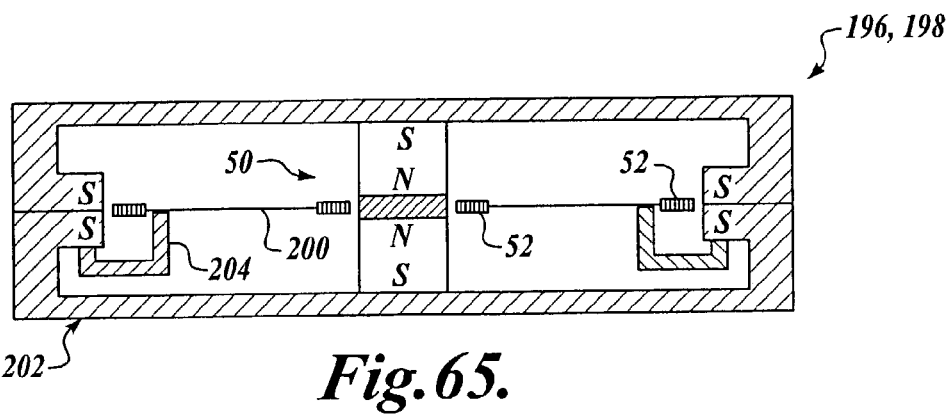
FIGS. 65 and 66 are schematic side views of two speaker/microphone embodiments formed in accordance with the present invention.
Figure 66:
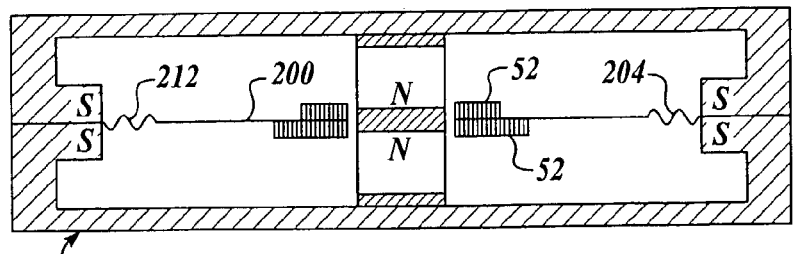

By combining the various teachings described herein, it is possible to create many different new and useful designs. For example, conventional speakers with push-to-talk (PTT) switches may be improved by using an arrangement such as that shown in FIG. 65 or 66. In FIG. 65, a bipolar magnet assembly having a central ferrous disc is held within upper and lower magnetic supports. A surround is used to support a disc-shaped diaphragm. An inner coil is connected to the diaphragm inner periphery. An outer coil is connected to the diaphragm outer periphery. The inner coil is used for microphone service; the outer coil is used for speaker service. The magnetic support arrangement of FIG. 66 is similar to that of FIG. 65. In FIG. 66 there is no surround per se, though, the outer periphery of the diaphragm includes a series of concentric ribs that can act as a surround. The speaker coil is located on one side of the diaphragm and the microphone coil is seated on the opposite side of the diaphragm. In this arrangement, the speaker and microphone coils each have their own appropriate impedances. It is possible to use a monopolar magnet system for this device as well.

By way of further example, because it is now possible to use separate coils for different uses, all in a singular magnetic assembly, conventional speakers such as tweeters and woofers may be combined into a single speaker, without loss of their specialized functions. In one embodiment, a speaker is formed having a center magnet system surrounded by concentric ring magnet assemblies. Various diaphragms and coils are placed in the emanating magnetic fields. This arrangement is useful for assigning different frequencies to different coils. Efficiencies may be realized in using coil and diaphragm sizes that are commensurate with the frequency being pushed.

While the preferred embodiments of the invention have been illustrated and described, it will be appreciated that various changes can be made therein without departing from the spirit and scope of the invention. As will be appreciated from a reading of the above, a multitude of configurations may be made using combinations of the plethora of components described, e.g., axial magnets (disc, ring, or otherwise), interface members, spacers, end caps, open space, radial magnets, magnet pairs, spiders, supports, surrounds, various drive coil designs, etc. While only a portion of such combinations are shown and described herein, such should not be considered limiting to the present invention as claimed. Further, many of the components described may be unitary objects or built up from subparts.

The embodiments of the invention in which an exclusive property or privilege is claimed are defined as follows:

1. A speaker comprising:
    (a) a magnet assembly including at least one magnet having an axial magnetization; the magnet assembly including first and second opposed outer pole faces and a magnetic field that emanates radially outwardly in a direction transverse to the axial magnetization;
    (b) a conductive drive coil having an outer size and an inner size; the coil having a height dimension and a width dimension, the width dimension being defined as the distance between the coil's inner and outer sizes; the drive coil's width dimension being at least as great as the height dimension; the drive coil being located in the radially emanating magnetic field of the magnet assembly; a space existing between the at least one magnet and the drive coil so that during use the drive coil is not in physical contact with the at least one magnet; the drive coil moving along an excursion path, at least a portion of the excursion path being located between the first and second outer pole faces; and
    (c) a diaphragm connected to one of the magnet assembly and the drive coil;
    wherein, as assembled, the drive coil is mounted in close proximity to the magnet assembly such that relative axial motion may occur between them during use; and wherein electric current in the drive coil causes relative motion between the magnet assembly and the drive coil, such relative motion further causing physical movement of the diaphragm to produce sound.

2. The speaker according to claim 1, wherein the magnet assembly includes first and second disc magnets each having axial magnetizations; the magnets being positioned coaxially with like pole faces oriented toward one another; the magnets having a maximum outer diameter size at the location of the outwardly emanating transverse magnetic field; and wherein the conductive drive coil has an outer diameter size and an inner diameter size, the drive coil's inner diameter size being larger than the maximum outer diameter size of the first and second magnets; wherein the coil width dimension is defined as the distance between the coil's inner and outer diameter sizes.

3. A speaker comprising:

(a) a magnet assembly having first and second ring magnets having axial magnetizations; the ring magnets being positioned coaxially with like pole faces oriented toward one another; the magnet assembly thereby forming both a magnetic field that emanates radially inward and a magnetic field that emanates radially outward; the ring magnets having a minimum diametric size at the location of the inwardly emanating magnetic field; the ring magnets having a maximum outer diametric size at the location of the outwardly emanating magnetic field;

(b) a conductive drive coil having an outer diametric size and an inner diametric size, the conductive coil being located in one of the inwardly emanating and outwardly emanating transverse magnetic fields; a space existing between the ring magnets and the drive coil so that during use the drive coil is not in physical contact with the magnets; the coil having a height dimension and a width dimension, the width dimension being defined as the distance between the coil's inner and outer diametric sizes, the width dimension being at least as great as the height dimension; and (c) a diaphragm connected to one of the magnet assembly and the drive coil;

wherein, as assembled, the drive coil is mounted in close proximity to the magnet assembly such that relative axial motion may occur between them during use; and wherein electric current in the drive coil causes relative motion between the magnet assembly and the drive coil, such relative motion further causing physical movement of the diaphragm to produce sound.

* * * * *

UNITED STATES PATENT AND TRADEMARK OFFICE
CERTIFICATE OF CORRECTION

| | |
|---|---|
| PATENT NO. | : 7,058,195 B2 |
| APPLICATION NO. | : 10/437716 |
| DATED | : June 6, 2006 |
| INVENTOR(S) | : R.P. Trandafir |

It is certified that error appears in the above-identified patent and that said Letters Patent is hereby corrected as shown below:

COLUMN     LINE     ERROR

Title Page     Item [60]     Relate U.S. Application Data
                             after "6,600,399," delete "application No. 10/437,716,"

Signed and Sealed this

Third Day of October, 2006

JON W. DUDAS
*Director of the United States Patent and Trademark Office*